United States Patent [19]

Crockett

[11] Patent Number: 5,050,384
[45] Date of Patent: Sep. 24, 1991

[54] TWO-STROKE CYCLE INTERNAL COMBUSTION ENGINE

[76] Inventor: Ivan L. Crockett, 2004 Lexington, San Mateo, Calif. 94402

[21] Appl. No.: 434,540

[22] Filed: Nov. 8, 1989

Related U.S. Application Data

[63] Continuation of Ser. No. 149,413, Jan. 29, 1988, abandoned.

[51] Int. Cl.$^5$ .................. F02B 37/00; F02B 33/12; F02B 41/04; F02B 75/32
[52] U.S. Cl. .................. 60/605.1; 123/65 VC; 123/74 R; 123/197 AC; 123/316; 60/269
[58] Field of Search .......... 123/56 BC, 65 VC, 74 R, 123/316, 197 AC; 60/605.1, 269

[56] References Cited

U.S. PATENT DOCUMENTS

| | | | |
|---|---|---|---|
| 2,097,883 | 11/1937 | Johansson | 123/316 X |
| 2,218,522 | 10/1940 | Butler | 123/56 BC X |
| 2,339,510 | 1/1944 | Olsson et al. | 123/65 VC X |
| 2,817,322 | 12/1957 | Miller | 123/316 |
| 3,309,865 | 3/1967 | Kauffmann et al. | 123/65 VC |
| 3,935,846 | 2/1976 | Zelenka | 123/90.11 X |

FOREIGN PATENT DOCUMENTS

| | | | |
|---|---|---|---|
| 955556 | 1/1957 | Fed. Rep. of Germany | 123/316 |
| 262070 | 4/1950 | Switzerland | 123/316 |

*Primary Examiner*—Michael Koczo
*Attorney, Agent, or Firm*—Joseph H. Smith

[57] ABSTRACT

A power plant has an internal combustion engine with piston backside pumping and a stroke of sufficient length to reduce the pressure of the combustion gases at the end of the power stroke to substantially a common inlet and exhaust pressure, extracting maximum power from the combustion gas expansion and reducing both power loss from expansion into the exhaust manifold and exhaust noise. For a cylinder the exhaust valve is opened at a specific time relative to the engine cycle, but exhaust closing is variable to account for changes in operating conditions and power settings. In a preferred embodiment the engine is a two-cycle compression-firing engine, and an exhaust valve for a cylinder is opened by cam action but closed at a variable time by an actuator controlled by a computer. In a further preferred embodiment the long-stroke engine is combined with an exhaust turbine, a compressor, an inlet duct, an acceleration nozzle, and a radiator in a power plant to maximize power and efficiency, and applied to aircraft propulsion.

10 Claims, 23 Drawing Sheets

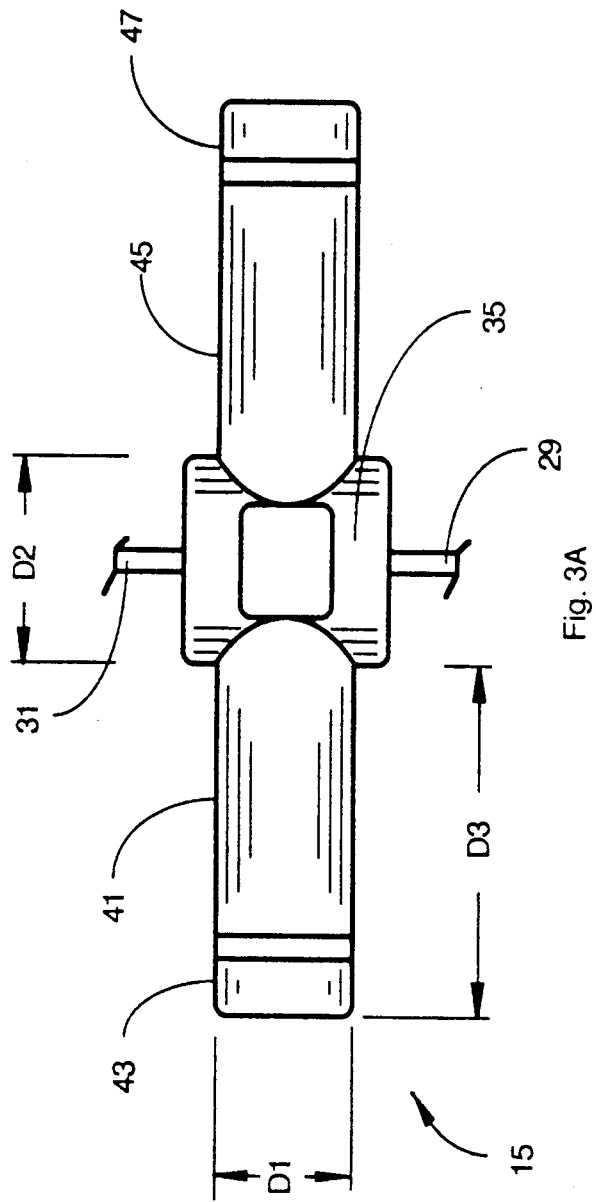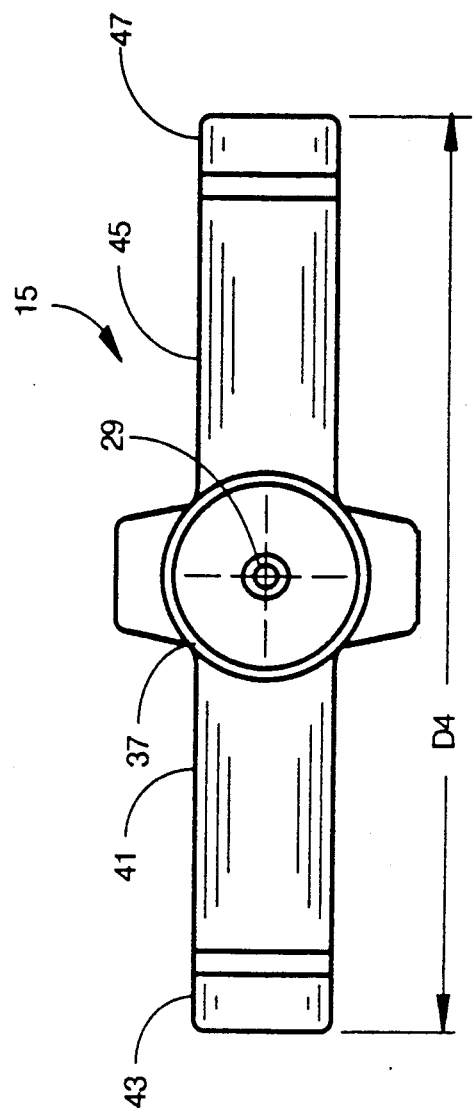

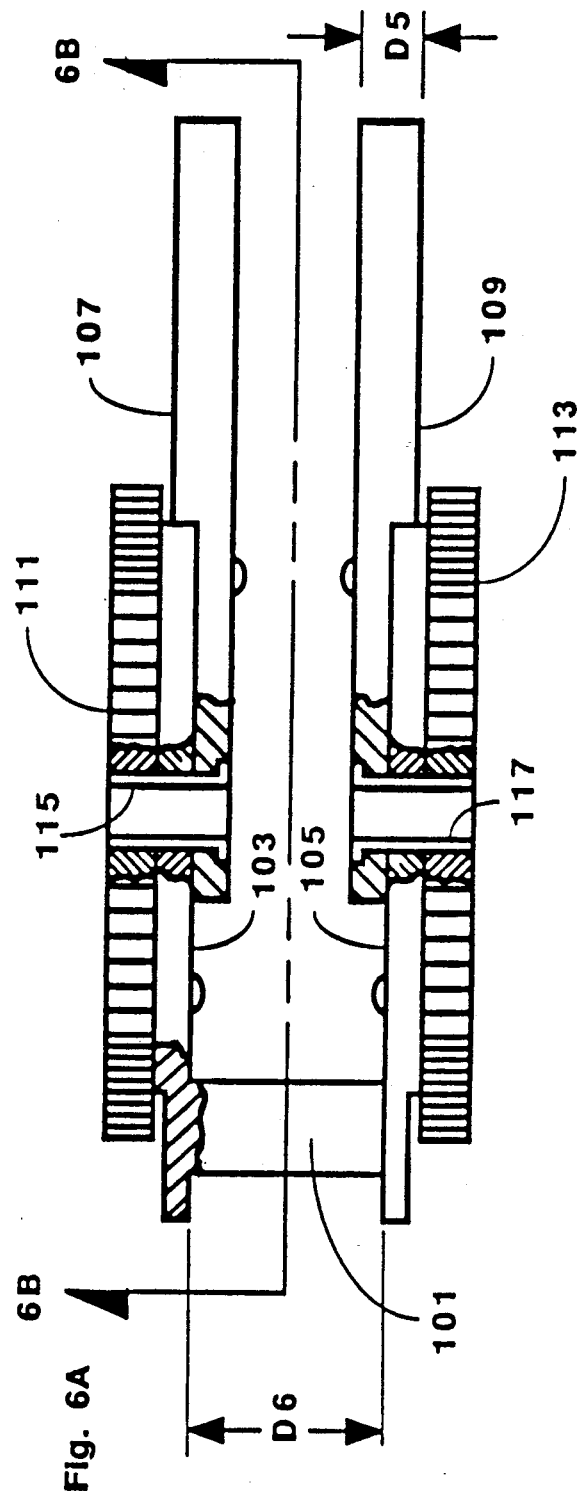

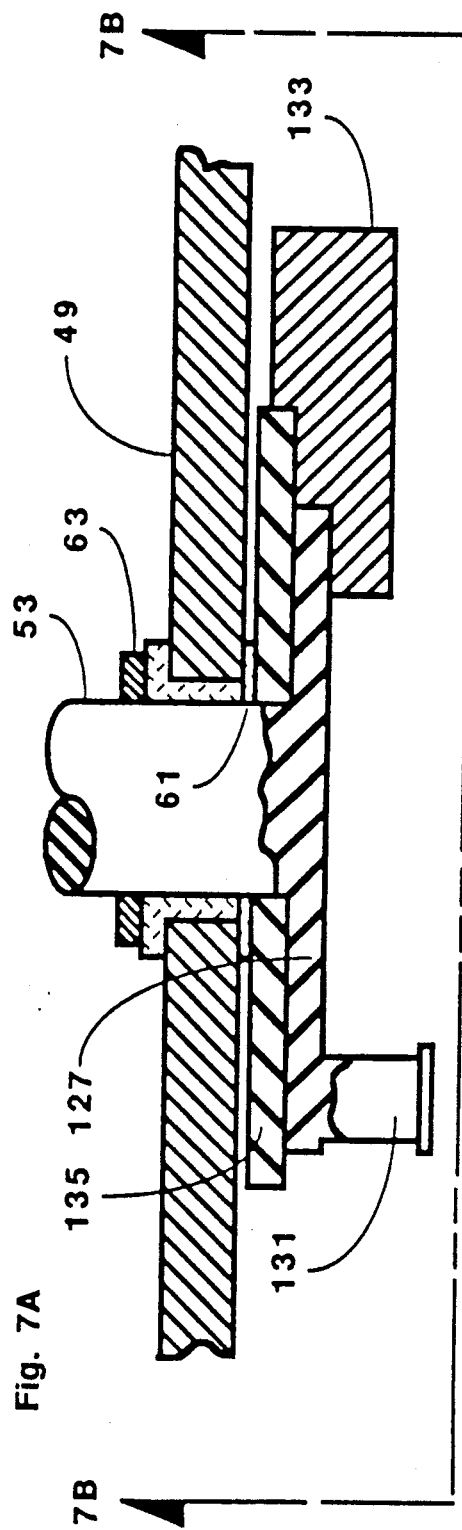

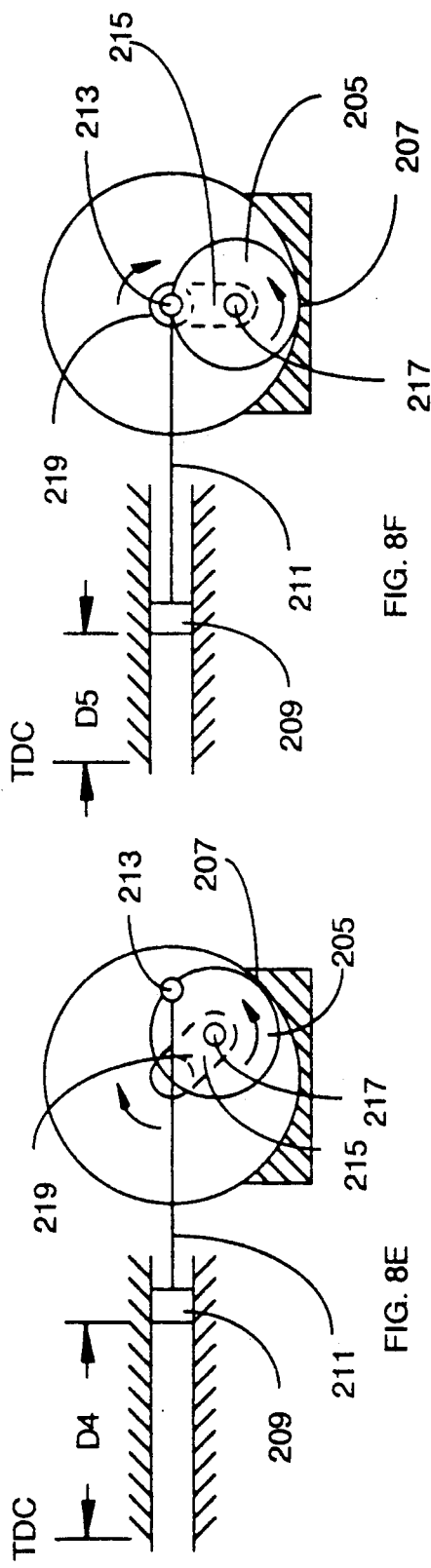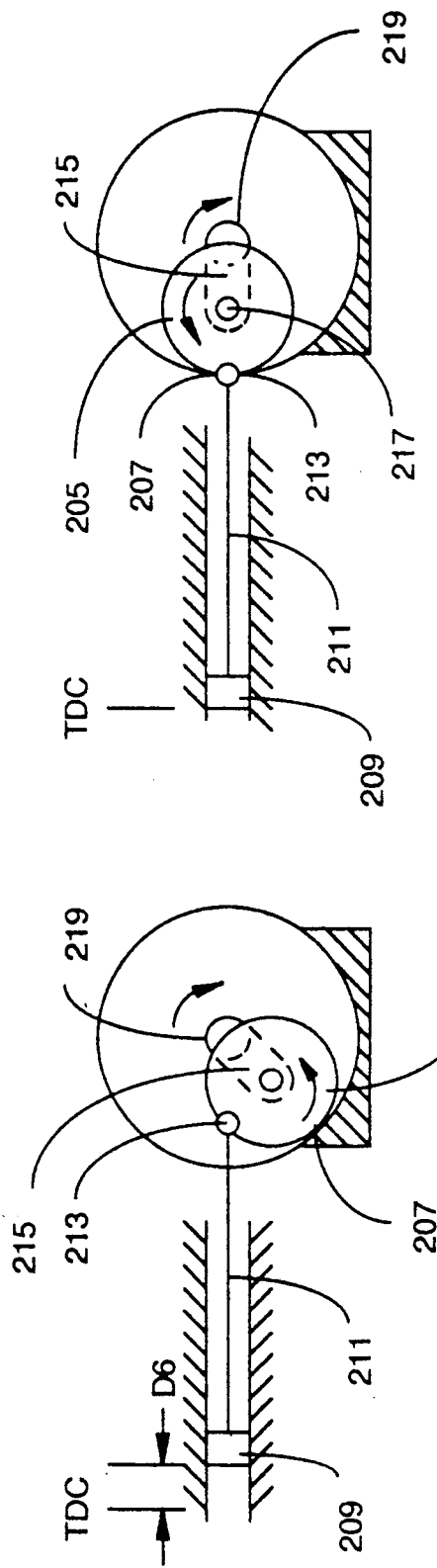

TWO-STROKE CYCLE INTERNAL COMBUSTION ENGINE

This is a continuation of application Ser. No. 149,413, filed Jan. 29, 1988, now abandoned.

BACKGROUND OF THE INVENTION

The present invention is in the area of internal combustion engines and the combinations of such engines with other devices for increasing the efficiency of converting energy in fuels to useful work. It is more particularly in the area of piston-type, compression-firing engines and peripheral devices. The invention has broad application, and is particularly suited to aircraft propulsion applications.

Internal combustion piston engines were first developed in the nineteenth century, and were successfully applied to stationary applications and land vehicle propulsion before the end of that century. Early in the twentieth century such engines were first applied to powering heavier-than-air aircraft. The successful flight by the Wright brothers at Kitty Hawk, N.C., in 1907 is an example. Piston engines of many sorts, used to drive propellors, have been developed since that time for propulsion of aircraft both large and small. Motivation for development has been provided by the military, commerical interests, and by sports enthusiasts.

During the Second World War gas turbine engines were developed for aircraft propulsion. Impetus was primarily military, for increased speed, rate of climb, and payload capability. Gas turbine engines, popularly called jets along with other types of reaction thrust engines, have since become the preferred engines for large aircraft. Today virtually all combat aircraft and large commerical transport aircraft are gas turbine powered.

In the area of civilian aircraft, for large commercial transport, the need is for speed and cargo capacity, to move a large weight of cargo or number of people quickly from one place to another. The turbine engine has proved to be the most cost effective of the engine alternatives, because of its low specific weight, i.e. weight to power ratio, and ability to provide very high power output.

Two disadvantages of turbines have prevented their becoming the preferred power plant for smaller commerical and privately owned aircraft. Such aircraft are variously classed as private, short-haul, commuter aircraft, and others. The first disadvantage is that turbine engines are in general relatively more expensive to design and manufacture than piston engines, because of extremely high rotary speeds and high temperatures compared to piston engines. The other disadvantage in small engines is that gas turbines use fuel at a relatively high rate. They are not fuel efficient. For smaller aircraft, the primary criteria for a power plant is often fuel efficiency. Fuel efficiency is most particularly an important criteria for privately owned and sport aircraft because of weight savings.

For these reasons, piston engines, which are relatively less expensive to manufacture and more fuel efficient than gas turbine and other types of thrust reation engines, are still the preferred engines for small aircraft today. Nearly all small aircraft engines are four-stroke, air-cooled, spark-ignition engines. There are many reasons this is true. Among them are the fact four stroke engines use a full stroke for exhaust and another for intake and are thus more efficiently aspirated than two stroke engines. This fact contributes both to fuel efficiency and to controllability. Precise control and ability to provide excess power above normal cruise conditions for take-off and climbing are important. Another is that spark ignition contributes to controllability by making ignition timing relatively easy to accomplish as opposed to compression-firing. Timing is very important in aircraft engines, particularly under heavy load and power conditions such as at take-off and during climbing. In addition, water cooling systems are generally bulky and add considerably to the gross weight of an aircraft, reducing net load carrying capacity and hence lower fuel efficiency.

In comparison of power plants for fuel efficiency, an often used characteristic is specific fuel consumption, henceforth sfc, which is the weight of fuel used per hour per horsepower produced. Considering power plants in general, a well controlled stationary diesel plant may in best case have an sfc of about 0.32. In aircraft, the larger piston, carbureted, spark ignition engines have the lowest sfc, but under 0.40 is rare. The well known voyager aircraft that flew around the world on a single load of fuel had an sfc of 0.36. In the present invention, prototype testing and computer simulation indicate an sfc of 0.25.

It has been recognized in the art, that if two-cycle engines could be used, that they would offer an advantage in weight. It has also been proposed to use the piston backside for air pumping and for power. Many two-cycle engines use crankcase compression in combination with valves and baffling to improve scavenging. Engines have been built with combustion occurring in both sides of the same cylinder. In that case complex systems to water cool the cylinders are required.

Beyond the goal of low specific fuel consumption, there are other problems with conventional piston-type aircraft power plants. One of these, not limited to aircraft engines, is that the overall thermodynamic cycle efficiency of a piston engine is related to the temperatures at the beginning and end of the compression stroke. For the idealized OTTO cycle, which describes the process of spark ignition piston engines, $E = 1 - T1/T2$, where E is efficiency and T1 and T2 are the air-fuel mixture temperatures at the beginning of the compression stroke and at the end of the compression stroke, respectively. Efficiency is enchanced either by lowering T1 or increasing T2. T2 is limited by fuel preignition in spark ignition engines and other engines in which fuel is present during the compression stroke. There are material limitations as well.

Another problem is related to the exhausting of piston engines of all types. After the power stroke in a conventional piston engine, the exhaust gases are still at a high pressure relative to the exhaust manifold pressure. When exhaust valves open there is a sudden sonic expansion into the exhaust manifold, with an irreversible energy loss. This energy is originally supplied by the combustion process, and is lost, not converted to work. The sonic expansion is also the source of objectionable engine noise in piston engines. Mufflers are often included in designs to reduce noise, but add weight and reduce performance.

Exhaust turbines are used to recapture some of the heat-provided energy in exhaust streams, but these do not recapture the energy lost by the expansion from the combustion chamber into the exhaust manifold.

What is needed is a two-cycle, compression-fired piston engine with compression control to provide for ignition timing, avoiding complex spark-ignition, expanding the combustion products on the power stroke to substantially the exhaust manifold pressure, and avoiding sonic exhaust expansion. Also, the exhaust should preferrably be combined with external devices to further improve efficiency and to extract the combustion energy, converting it to thrust for propulsion, thereby providing an improved, i.e. lowered, sfc.

SUMMARY OF THE INVENTION

An internal combustion engine is provided according to the invention that significantly improves specific fuel consumption over conventional engines, providing an sfc as low a 0.25 in simulated testing, as well as other important benefits. Improved sfc is accomplished in part by providing increased thermodynamic efficiency. The engine may be configured in a manner that significantly reduces weight to power output as well, and lends itself to operation with other devices which will in some applications, such as for aircraft propulsion, further increase efficiency. In addition to being more efficient, the engine is quieter in operation than piston engines presently in use, and requires no muffler for quiet operation, thus providing substantial cost savings and at the same time reducing weight.

A power plant is provided with an internal combustion engine in which the pistons have an unusually long stroke, such that in two cycle operation exhaust and compression may be accomplished in a single stroke of a piston in one direction, and the stroke in the other direction expands the products of combustion to substantially the pressure of air to be inducted for a next power cycle. The long stroke expansion to substantially inlet pressure provides introduction of new air with a very low pressure differential, resulting in minimum exhaust dilution and increased efficiency. The long stroke expansion also provides for exhaust performed principally by piston movement with little or no sudden expansion at the exhaust valves, minimizing energy loss normally incurred by engines that exhaust with a high pressure differential, and also virtually eliminating exhaust noise.

In a preferred embodiment, the long-stroke engine incorporates backside piston pumping, which, by virtue of the long stroke, provides a greater amount of air to a cylinder for compression than is possible with shorter piston strokes. The large amount of air provided together with the minimum exhaust dilution results in a relatively greater amount of air for compression than with engines of shorter stroke and less efficient scavenging, and thus a higher power capability. Exhaust valves are closed in the combination exhaust/compression stroke at a point at least midway in the stroke to begin compression, and the closing time of the exhaust valves is controlled with reference to inlet pressure to ensure expansion back to substantially the inlet pressure.

In the preferred mode, the engine is compression fired, avoiding complex ignition systems, and one or more sets of cylinders are opposed. This, combined with a novel folded crank assembly, provides for good dynamic balancing and relatively simple construction. The backside of pistons may also be used to pump air to combustion chambers, further increasing the relative efficiency. In such engines, with suitable piston stroke length, by adjusting the position of closing the exhaust valve, expansion may proceed to an absolute pressure substantially equal to the absolute pressure in the exhaust manifold, avoiding any sonic expansion energy loss at exhaust, and also avoiding expansion energy loss at exhaust, and also avoiding excessive and objectionable exhaust noise.

In an application of the engine as a main power plant for a vehicle, particularly an aircraft, the engine drives a propellor for thrust, and a small thermal jet is incorporated in conjunction with the long-stroke engine to further increase overall efficiency. Exhaust from the piston engine drives a turbine in the jet section, referred to as the turbo-compressor-fan section, and then exits the jet providing additional thrust. The turbine drives a compressor that compresses air for the inlet of the piston engine, and also a fan at the jet inlet, to compress the incoming air stream. A cooling system extracts otherwise wasted heat from the piston engine and delivers it to a radiator in the jet section where the air stream passing through the jet is heated, providing yet further thrust.

BRIEF DESCRIPTION OF THE DRAWINGS

FIG. 1A shows a block diagram of a computer system used for controlling the operation of the long stroke turbine system.

FIGS. 3A and 3B show two views of the exterior of a long stroke internal combustion engine according to the invention.

FIGS. 6A and 6B show plan and side views of a flying crank assembly of the engine of FIG. 4.

FIGS. 7A and 7B show a plan view and a side view of a crank and drive shaft of the engine of FIG. 4.

FIGS. 8A–8H show eight successive positions of the flying crank assembly during operation.

DETAILED DESCRIPTION OF THE PREFERRED EMBODIMENTS

Figure 1:
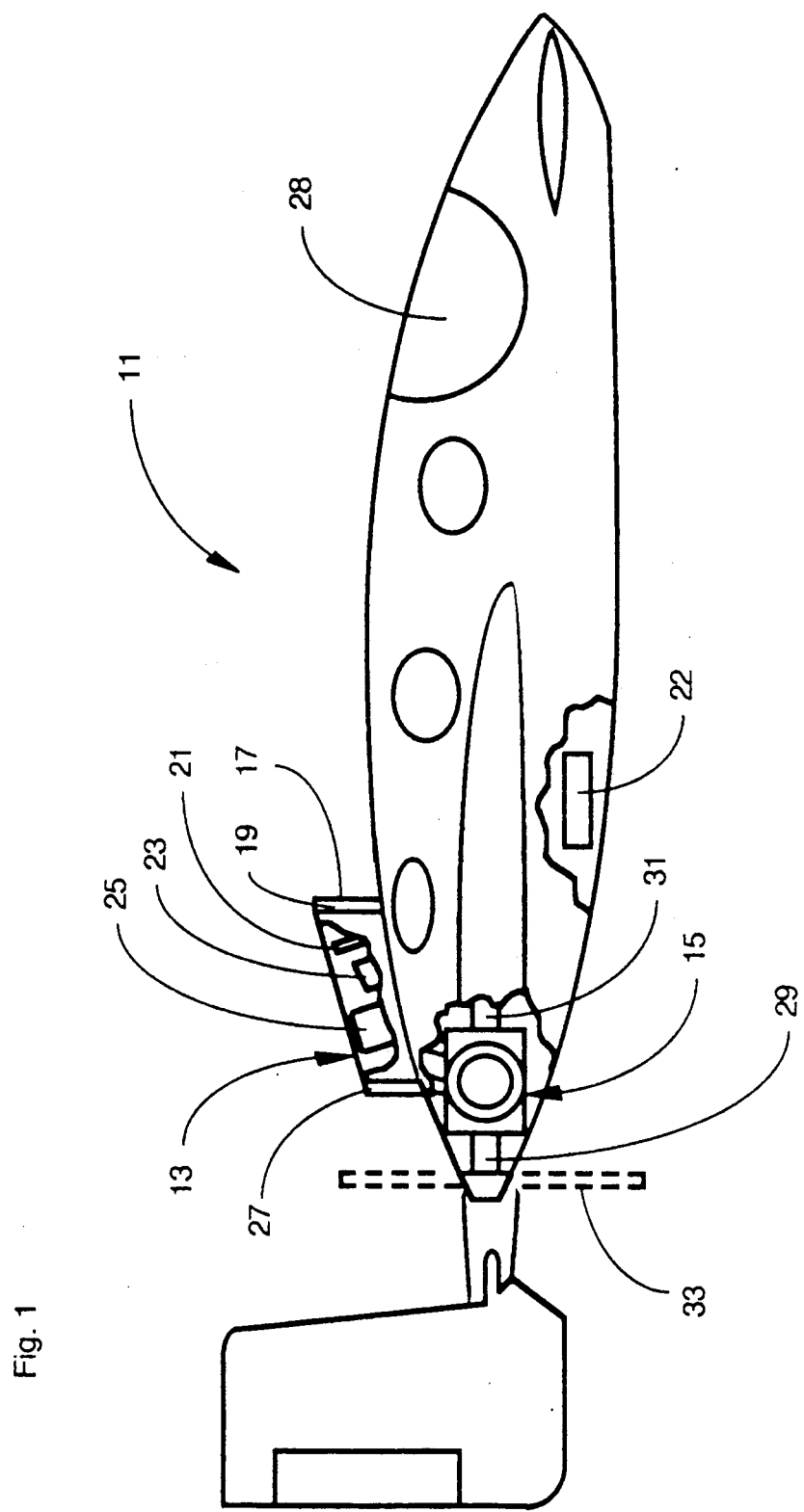
FIG. 1 shows a side view of a conard-style aircraft using a long stroke turbine system according to the invention.
Figure 2:
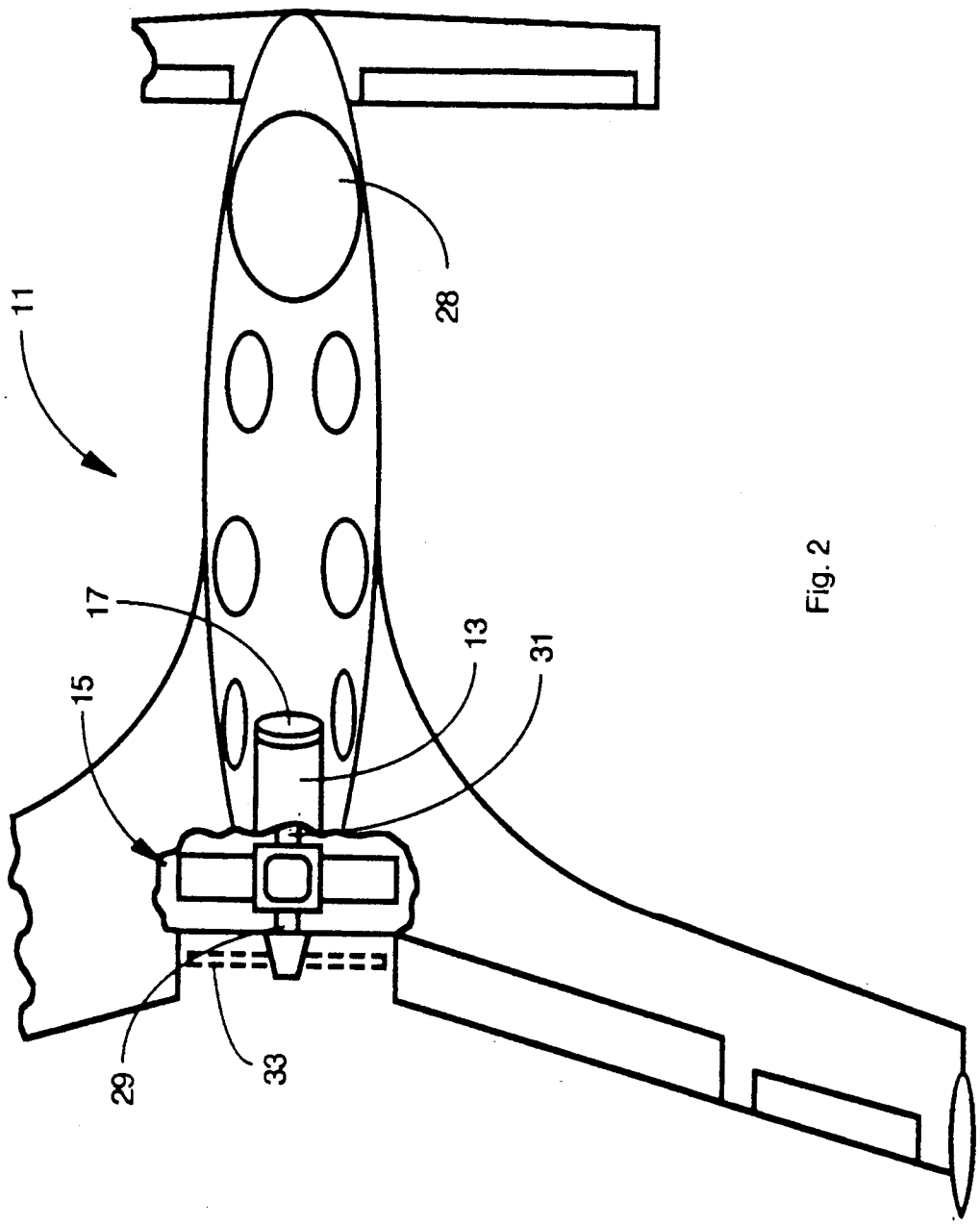
FIG. 2 shows a top view of the aircraft and the relationship of the long stroke turbine system to the aircraft.

The propulsion system of the invention is known as the Long Stroke Turbine system (LST), and combines features of both a turbine engine and a piston engine. Turbine engines are generally chosen for aircraft propulsion above about 1500 horsepower because of an ability to provide high power with low weight. In lower power applications piston engines exhibit better efficiency. The LST system has better efficiency than either conventional OTTO or Diesel cycle piston engines or turbine engines. In a preferred embodiment the LST powers a canard-style light aircraft of about 3500 pounds net weight, although the invention may be readily adapted in other embodiments to power other types of aircraft and even land and water vehicles. FIG. 1 and FIG. 2 show the LST propulsion system in a conard-style aircraft 11.

The LST propulsion system includes a turbine-compressor-fan section (TCF) 13; which is a miniature, low-pressure jet engine; and a long-stroke piston engine (LS) 15. In the preferred mode, in aircraft 11 the TCF section is mounted near the rear and above the fuselage, and includes a cylindrical duct with a major outside diameter of about 38 cm. and an overall length of about 66 cm. within which the other elements making up the TCF section are mounted. The vertical plane of side-to-side symmetry of the TCF duct and of the aircraft are a common plane, and the longitudinal axis of the TCF duct is directed downward to the rear forming an angle of about 10 degrees to the axis of the fuselage of the aircraft. Incoming air to be incorporated in propulsion passes into the TCF duct through forward opening 17, of about 25 cm. diameter, and an initial diffuser portion 19. In the diffuser portion the diameter of the duct increases to about 30 cm. and the velocity of the incoming air is lowered while the absolute pressure is increased.

A fan 21 driven by the propulsion system is positioned in the TCF duct near the end of diffuser portion 19, and the fan further increases the air pressure. After air passes the fan, a part of the air enters a turbine-compressor 23. The compressor portion of turbine-compressor 23 increases the pressure and the temperature of the part of the air stream it handles. Some of the air after the compressor is drawn off and used for cabin pressurization, and the rest of the compressed air flow goes first to a cooler 24 (not shown in FIG. 1 or FIG. 2), and then to the LS engine. The cooler is a counterflow heat exchanger in which liquid coolant in a closed system serves to cool the air flowing to the LS engine. This air flow is the sole air supply for combustion in the LS engine. Exhaust from the LS engine goes back to turbine-compressor 23 and provides power by expanding through the turbine to drive both the compressor and the fan. The exhaust gas flow from the turbine enters the TCF duct near the rearward end. This exhaust stream does not pass through radiator 25.

Air flow not diverted via the compressor continues through the TCF duct and passes through radiator 25. The radiator in the preferred embodiment is of a type well known in the art in which the passages for the liquid coolant are flattened tubes presenting a minimum area to the direction of the airstream through the TCF section. Coolant from the LS engine flows through radiator 25 when operation is under a condition of "no ice" on the wings, giving up waste heat and thereby adding energy to the airstream. This air flow through radiator 25 joins the exhaust from the turbine, and the two gas streams are accelerated through nozzle portion 27 out the rearward opening of the TCF providing a portion of the total thrust provided by the LST system.

LS engine 15 is positioned at the rear of the fuselage of the aircraft below the TCF. The LS engine is a two cycle engine with two opposed cylinders. The cylinder portions extend into the root of the large rear wing of the aircraft on opposite sides, and there are two driven shafts, both disposed along an axis substantially coincident with the longitudinal axis of the aircraft. Shaft 29 extends to the rear and drives a propeller 33 which provides thrust for propulsion in addition to the thrust provided by the TCF. Shaft 31 extends forward and provides auxiliary power.

In FIG. 1 an on-board flight computer 22 is shown in the fuselage in the rear of the aircraft beneath the position of the large rear wing. The computer may well be located at other convenient locations in the aircraft, and is a part of a computer system 20 comprising computer 22 and an array of communication lines, actuators, and sensors throughout the aircraft.

FIG. 1A is a block diagram of computer system 20 comprising computer 22, an input/output (I/O) section 26 and sensors and actuators (not shown). Arrows 30 and 32 represent communication lines to and from the computer and the I/O section. Arrows 34 and 36 represent communication to and from LS engine 15. Typical measurements made by the computer system at the LS engine are oil pressure and temperature, cylinder head temperature, and cooling water temperatures, among others. Typical actuators at the LS engine, which are controlled by the computer, control closing of the exhaust valves and timing and duration of fuel injection. Arrows 38 and 40 represent communication to and from TCF section 13, where the computer system monitors such characteristics as incoming air temperature and pressure, and exhaust temperature. Lines 42 and 44 represent communication with flight deck 28, where instruments read out many of the variables monitored by the computer for the pilot or other flight crew, and inputs may be made to the computer system. An additional important function of the computer system is monitoring icing conditions and controlling valves that direct the flow of liquid coolant in the aircraft between the LS engine, the radiator, channels in the wing and canard, and other heat exchange sub-systems of the aircraft.

FIG. 3A and FIG. 3B show the general outline configuration of LS engine 15. FIG. 3A is a plan view and FIG. 3B is a view in the direction of the longitudinal axis of the aircraft and the crankshafts of the LS engine. A central crankcase section 35 houses a unique folded-crank mechanism (not shown in FIG. 3A or FIG. 3B), and shafts 29 and 31, both driven by the engine via the folded-crank mechanism, extend from the crankcase on opposite sides. Cylinder portion 41 extends from crankcase 35 orthogonal to the axis of shafts 29 and 31 and ends at head portion 43. A similar cylinder portion 45 extends from the crankcase opposite cylinder portion 41 and ends at head portion 47. The axes of cylinder portions 41 and 45 are colinear, passing through the center of crankcase 35. In this preferred embodiment, the major outside diameter D1 of each of the two cylinder portions is about 20 cm., the center cylindrical crankcase diameter D2 is about 36 cm., the length of one cylinder portion D3 is about 58 cm., and the overall length D4 of the LS engine in the direction of the cylinder axes is about 152 cm. Many appurtenant structures such as manifold connections and valve operating linkages that connect to the LS engine and are necessary for its operation are not shown in FIG. 3A or 3B so that the general structure and size may be better illustrated. These other elements are shown in subsequent figures and explained below.

Figure 4:
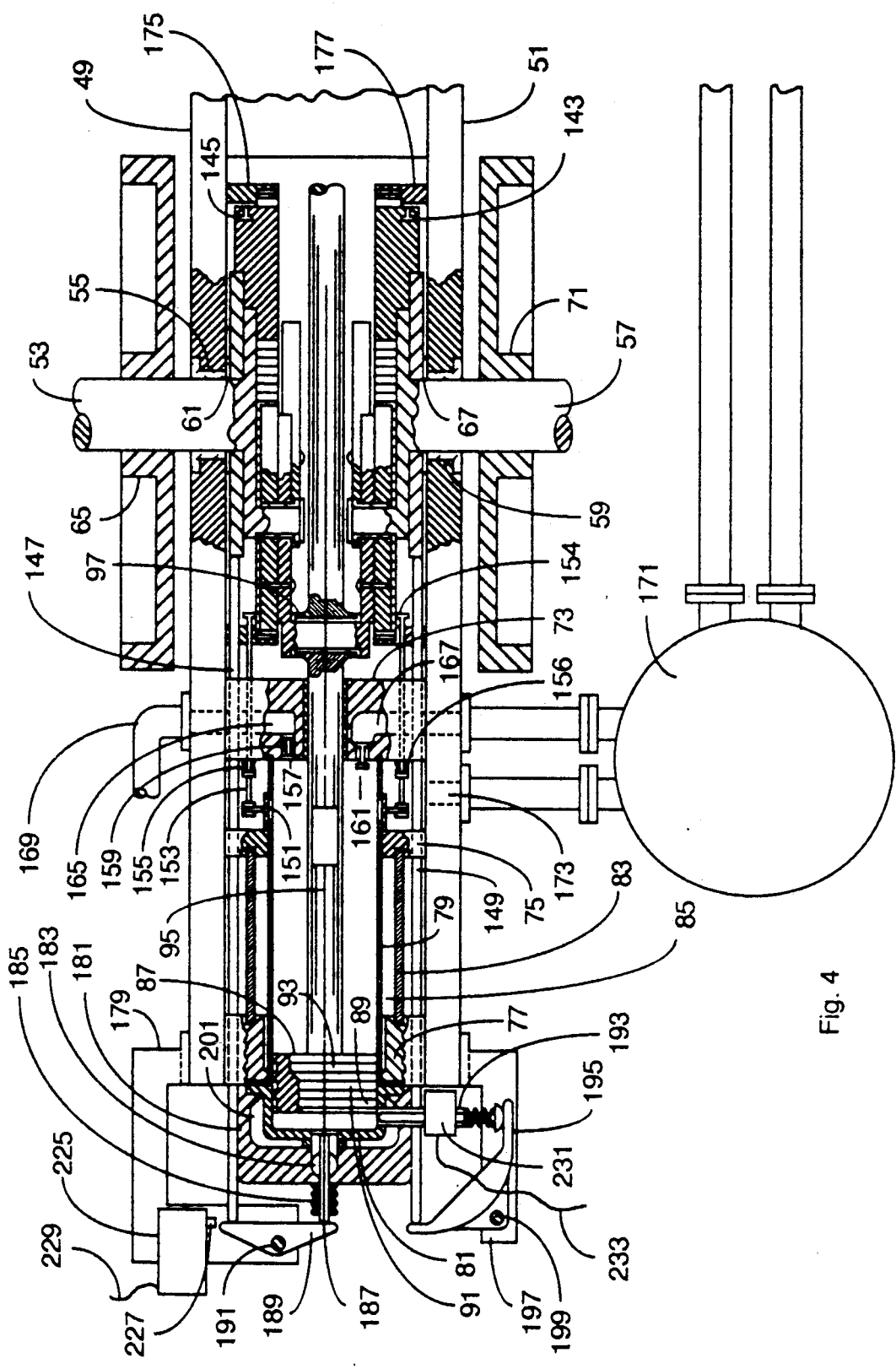
FIG. 4 shows a cut-away view of one cylinder of the long stroke internal combustion engine.

The LS engine is a direct injection compression-firing internal combustion engine. The heat added to the trapped gas ahead of a piston by virtue of compression is utilized to ignite the fuel air mixture, thereby avoiding a requirement for an electrical ignition system with spark plugs or other electrical ignition elements. FIG. 4 is a cut-away plan view of a preferred embodiment of the LS engine built and tested as a prototype. Rather than an assembly of castings, as is usual with internal combustion engines, and which is the form of the engine shown by FIGS. 3A and 3B, the engine of FIG. 4 is built entirely of machined elements assembled to two principal framing rails 49 and 51. One of the purposes of construction of this kind for the prototype engine is so that experimental changes in design may be relatively easily and conveniently managed. In subsequent engines designed for mass production and minimum manufacturing cost, it is expected that castings will be liberally used. The differences in construction technique do not result in differences in the principles of operation of the engine that would alter the spirit and scope of the invention.

In FIG. 4 there are two drive shafts, equivalent to drive shafts 29 and 31 of FIGS. 3A and 3B. Output drive shaft 53 extends through journal bearing 55 through rail 49. A flywheel 65 is rigidly attached to shaft 53 by fasteners (not shown). A similar drive shaft 57 extends through journal bearing 59 through rail 51. A flywheel 71 is rigidly mounted to shaft 53. Flywheels are needed only in certain applications, as in a prototype engine not driving a particular load. In applications where a load is driven and the load has sufficient rotary inertia, such as when driving a propeller, a flywheel is not needed. In this preferred embodiment, drive shafts 53 and 57 are each about 5.5 cm. in diameter, and made of hardened carbon steel. Flywheels 65 and 71 are made of steel, and are each about 42 cm. in diameter. The two drive shafts extend in opposite directions and are not connected straight through the engine, as is common with the crankshafts of most internal combustion engines, although they are connected by elements internal to the crankcase, and turn in unison. The assembly is captured between rails 49 and 51, utilizing thrust washers 61 and 67. Power produced by the combustion of fuel in the engine is delivered from the engine via shafts 53 and 57.

A feature of the LS engine is an uncommonly long stroke compared to the piston bore. The use of two output drive shafts not directly connected through the engine is, in part, to accomplish the uniquely long stroke. In order to show considerable detail in FIG. 4, only one of the two opposed piston and cylinder arrangements is shown. The other is a symmetrical image of the assembly shown, and operates in the same manner, but exactly 180 degrees out of phase with the first.

There are three spacer blocks between framing rails 49 and 51 that space apart the rails and help to frame other elements that comprise one of the two cylinders. Breather block 73 is nearest the center of the engine where the drive shafts emerge, and forms the bottom end of the cylinder enclosure. Spacer block 75 serves multiple purposes. It forms one end of a cooling water passage for the cylinder and serves as a seat for a cylindrical cover valve, for example. Head block 77 is at the outer end of the cylinder, and is the framing element to which the elements forming the combustion chamber are fastened. The walls of the cylinder are formed by an inner liner 79 extending from head block 77 through breather block 73. The inside diameter of liner 79 is the "bore" of the LS engine. An outer cylinder sleeve 83 extends from head block 77 to spacer block 75, and is concentric with inner liner 79. Annulus 85 between the two is a coolant passage served by openngs (not shown) to carry waste heat away from the cylinder.

A piston 87, similar to pistons used in conventional internal combustion engines, fits into the bore of the cylinder, and piston rings 89, 91, and 93 serve to close the annulus between the cylinder bore and the smaller outside diam^ter of the piston The cylinder bore of the prototype engine is about 13 cm., and the diameter of the piston is typically about 0.013 cm. smaller. The prototype piston is made of stainless steel, but might well be a casting in engines designed for mass production, as is typical in the art. Also as is typical in the art, the two piston rings 89 and 91 closer to the combustion side of the piston are compression rings, and piston ring 93 is an oil control ring. There is, in the prototype engine, also a pressed-on aluminum ring (not shown) to avoid steel-to-steel contact. This ring will not be necessary in many other applications.

In conventional internal combustion engines the cylinder is closed at the outer end by a "head", forming a combustion chamber with the piston, and is open at the inner end at the crankcase. In the LS engine, the cylinder is closed at both ends. Head liner 81 is the closure at the outer end, and breather block 73 is the closure at the inner end, adjacent to a "crank" assembly by which the linear action of the pistons is converted to rotary power and output at the two drive shafts. The closure of the cylinder at the end opposite the combustion chamber allows the backside of the piston to act on the backside volume as a constant displacement air pump to furnish air to the combustion side with each cycle.

Piston 87 is shown in FIG. 4 at substantially the position known in the art as "top dead centeer", at which point the piston has advanced during the compression portion of the cycle to the nearest point that it approaches head liner 81, and the volume between the piston and the head is the least that is attained in the engine cycle. The LS engine is a compression firing internal combustion engine, and as such, the compression ratio, which is the ratio of the frontside cylnder volume at the point that the exhasut valve closes, to the frontside volume when the piston is at top dead center, as in FIG. 4, is sufficiently high that the heat of compression will be sufficient to ignite the fuel-air mixture when fuel is injected into the combustion chamber near top dead cneter. In the prototype LS engine, the total cylinder displacement, or frontside swept volume is about 4146 cubic cm. (the frontside is the combustion side of the piston). The stroke of the piston, which is the extent of linear travel along the cylinder, is about 30.5 cm.

As in most reciprocating internal combustion engines, it is the force of expansion of burning fuel mixed with ingested air (for the oxygen to support combustion) that provides power. Combustion on the frontside drives piston 87 along the cylinder, and the linear motion is imparted to a connected rod that is attached to the piston, and via the connecting rod by agency of a unique crank arrangement, the force becomes a torque force driving the output shafts.

In conventional internal combustion engines the connecting rod is pivotally attached to the piston by a journal bearing and pivotally attached at the other end by means of another journal bearing to a "throw" that is offset from a crankshaft such that the piston and the crank form a well-known "bell crank" arrangement. In contradistinction, the LS engine has a unique "folded crank" arrangement that allows the connecting rod to travel in a straight line, along the longitudinal centerline of the cylinder. It is the linear motion of the connecting rod along the axis of the cylnders that allows the "bottom end" of the cylinder to be closed, and the backside of the piston to be used as an air pump, metering and supplying air for combustion. In FIG. 4, connecting rod 95 is rigidly attached to piston 87 by fasteners (not shown), rather than being pivotally attached as in conventional engines. As piston 87 moves away from headliner 81 during the expansion (power) stroke, the connecting rod moves in a straight line along the axis of the cylinder.

Figure 5:
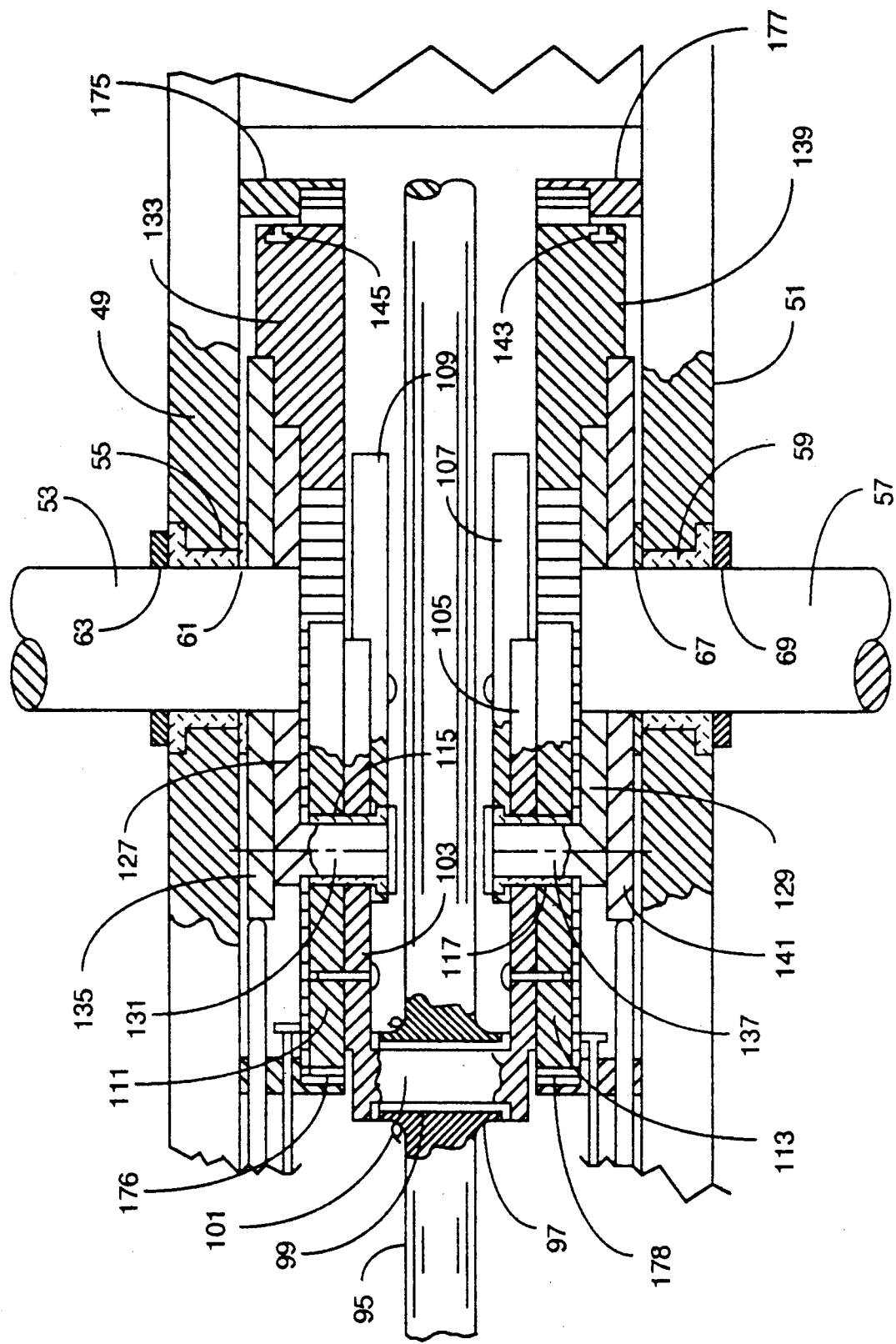
FIG. 5 shows an enlarged view of the crank portion of the engine of FIG. 4.

FIG. 5 is an enlargement of the crank area of FIG. 4, showing all the elements of the prototype engine that makee up the folded crank arrangement. Connecting rod 95 has an enlarged portion 97 through which a journal bearing 99 is mounted at 90 degrees to the longitudinal axis of the connecting rod, and parallel to the two output drive shafts. The connecting rod extends straight through the crank area to another piston in a cylinder in line with and directly opposite the cylinder that has been described. Both pistons are fixedly attached to connecting rod 95, so that when piston 87 is moving toward healiner 81 (FIG. 4) in the compression portion of the cylce for that piston, the opposite piston is moving away from the corresponding headliner on the opposite side, in the expansion (power) portion of the cycle for that piston. Two pistons opposed but sharing a single connecting rod provide a shorter assembly in the direction of the output shafts than would otherwise be possible. The arrangement also provides for ideal translational balancing.

Figure 6B:
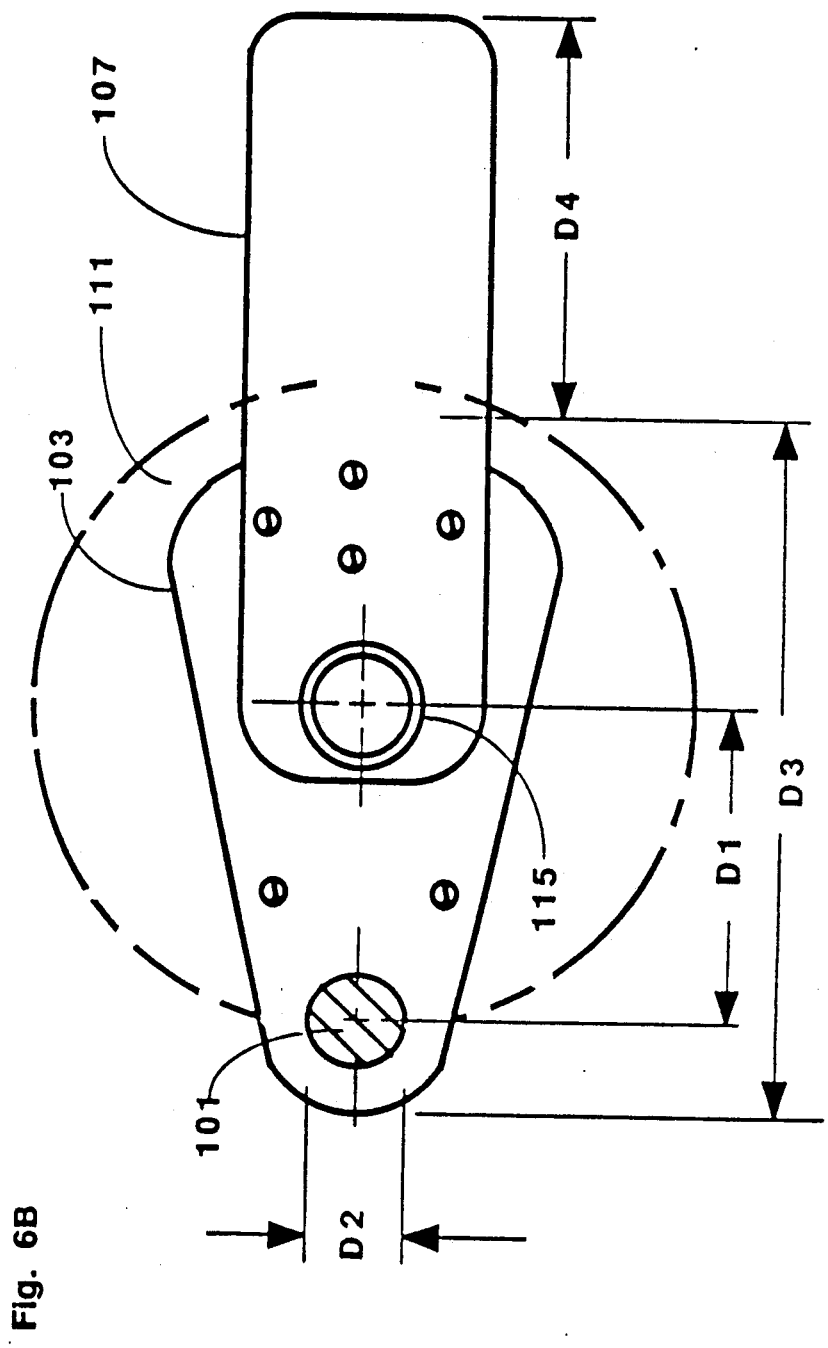

Journal bearing 99 through connecting rod 95 pivotally attaches the connecting rod to shaft portion 101 of a flying crank assembly. FIG. 6A and 6B show a plan view and a side view section respectively of the flying crank assembly. Arm poritons 103 and 105, counterweights 107 and 109, flying-crank gears 111 and 113, and journal bearings 115 and 117 are other parts comprising the flying crank assembly. Shaft portion 101 and arms 103 and 105 are machined steel, although other materials, such as cast steel would also be suitable. Counterweights 107 and 109 are also typically machined steel. In this preferred mode, flying crank gears 111 and 113 each have a pitch diameter of about 15.25 cm. and are about 2.54 cm. in thickness. Gear 111 is fixedly attached to arm 103 and bearing 115 passes through the center of the gear. Similarly, gear 113 is fixedly attached to arm 105 and the gear is centered on bearing 117. The arrangement is such that the centerline of shaft 101 is at the pitch diameter of the flying crank gears, providing the mechanical effect in the overall assembly of the folded-crank mechanism of having the connecting rod pivotally attached to the gears at the pitch diameter of the gears.

In the flying crank assembly, counterweights 107 and 109 are separate parts from arms 103 and 105 and are mounted to the arms by fasteners (not shown). The separate mounting allows for alteration of the counterweights as required in the prototype engine. In a production engine the counterweights may be an integral part of the arm. In this preferred embodiment, dimension D1 is the pitch radius of the flying crank gears, and is about 7.6 cm. The arm length D3 is about 15.2 cm. The width of an arm D2 is about 1.0 cm. The extension of the counterweights D4 beyond the arms is about 5.7 cm., and the width D5 of a counterweight is about 3 cm.

Figure 7B:
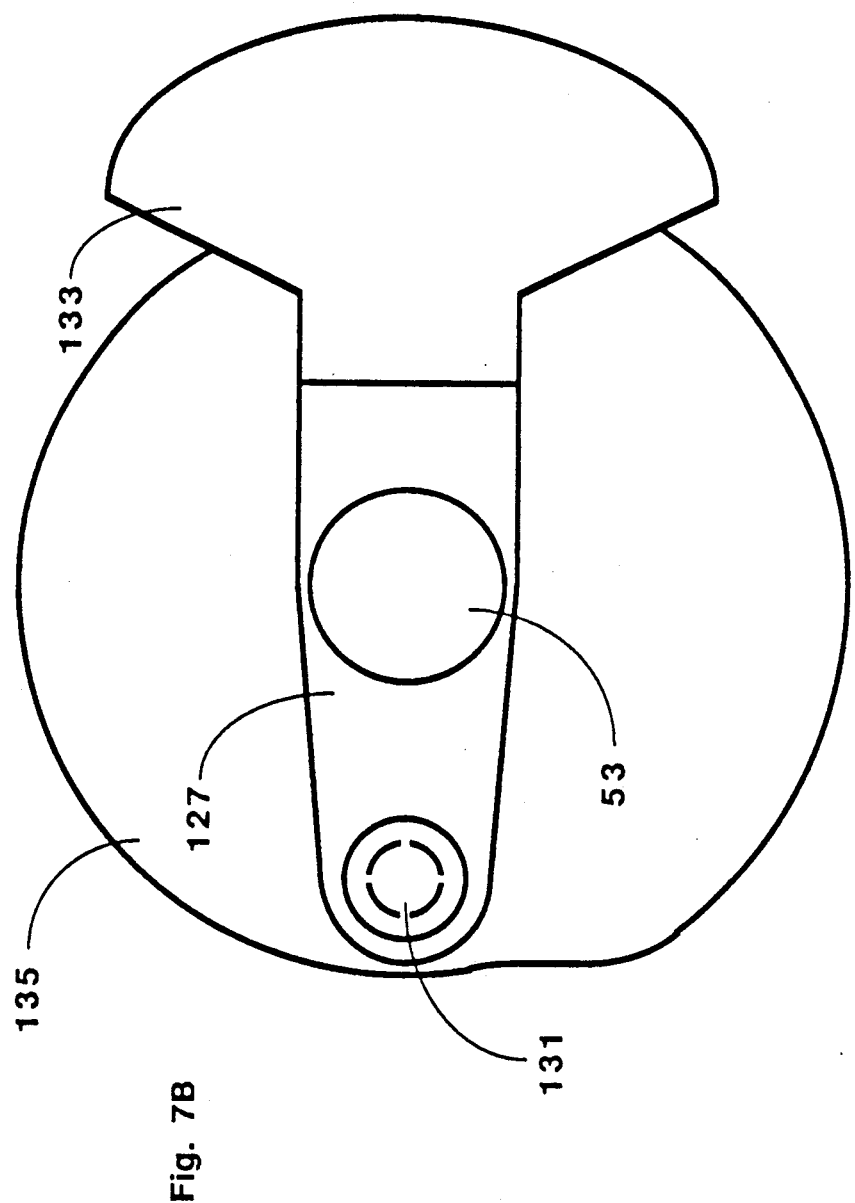

There are two central cranks (FIG. 5). Crank 127 is a part of shaft 53 and crank 129 is a part of shaft 57. FIG. 7A, and FIG. 7B are a plan view and an elevation view of drive shaft 53, crank 127, and the immediately associated elements. Crank 129 on the opposite side of the crankcase is a part of drive shaft 57, and similar to crank 127. Pivot shaft portion 131 is a part of crank 127. A cam 135 is rigidly mounted to shaft 53, amd is used in conjunction with pushrod 147 (FIG. 4) to control the opening and closing of exhaust valve 187 serving the conbustion chamber. FIG. 5 shows the connection between the central cranks and the flying crank assembly. Pivot shaft 131 is assembled into journal 115 of the flying crank assembly and pivot shaft 137 is assembled into journal bearing 117. The flying crank assembly this constrains the two central cranks to rotate together, and the two output drive shafts to also rotate together and in the same rotary direction. There are two internal ring gears in the crankcase arrangement, each with exactly twice the pitch diameter of the flying crank gears. Internal ring gear 175 is fastened to side rail 49 by fasteners (not shown, and is concentric with drive shaft 53. Ring gear 177 is fastened similarly to side rail 51 in the prototype engine, and is concentric with drive shaft 57. In FIG. 5 flying crank gear 111 is shown in mesh with ring gear 175 at position 176 and flying crank gear 113 is shown in mesh with ring gear 177 at position 178. The ring gears may be considered to form an outer portion of the crankcase of the LS engine, concentric with the output drive shafts.

Figure 8A:
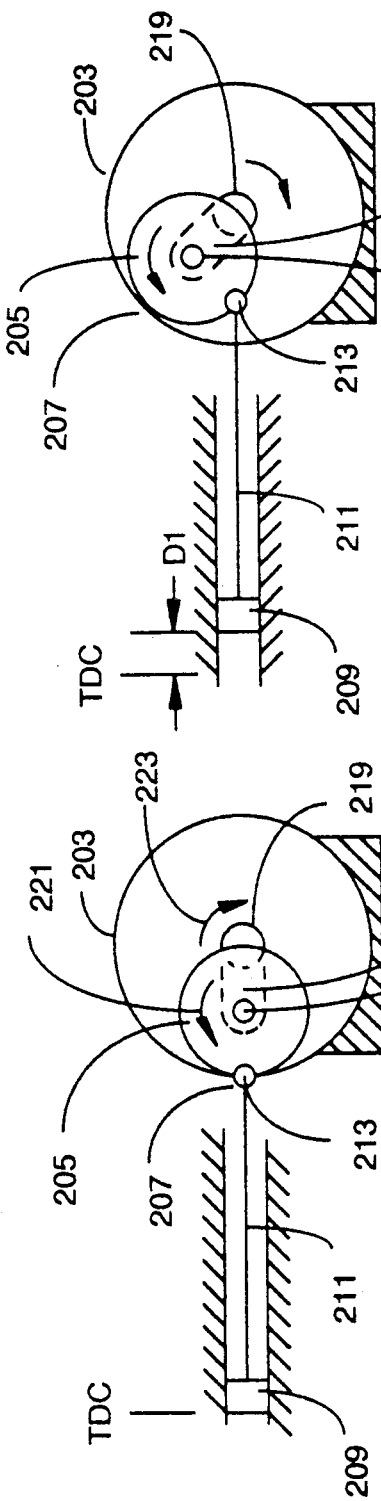

FIGS. 8A through 8H are schematics showing the relationships of elements of the folded crank with one another through eight successive positions in a full rotation of the drive shafts. In FIG. 8A the schematic represents the LS engine with one piston at top dead center (TDC), just as is shown in FIGS. 4 and 5. Ring 203 is equivalent to the ring gears of FIGS. 4 and 5. A representation 205 one of the flying crank gears is shown in mesh with ring 203 at point 207. Also shown are a piston 209, a connecting rod 211 and a pivot point 213, where the connecting rod is pivotally attached to gear 205 at its pitch radius. Crank arm 215 is pivotally attached to gear 205 at point 217, the gear center, and at the other end is fixed to output drive shaft 219. As a matter of convention in the illustrations gear 205 rotates in the direction of arrow 221, so, since the gear is meshed with ring gear 203, crank 215 and drive shaft 219 will rotate in the direction of arrow 223.

Figure 8B:
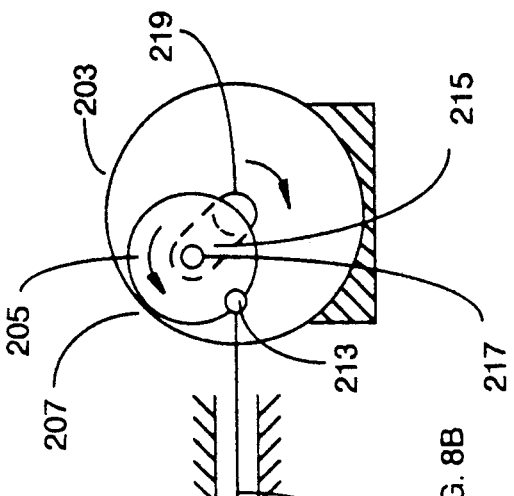
Figure 8C:
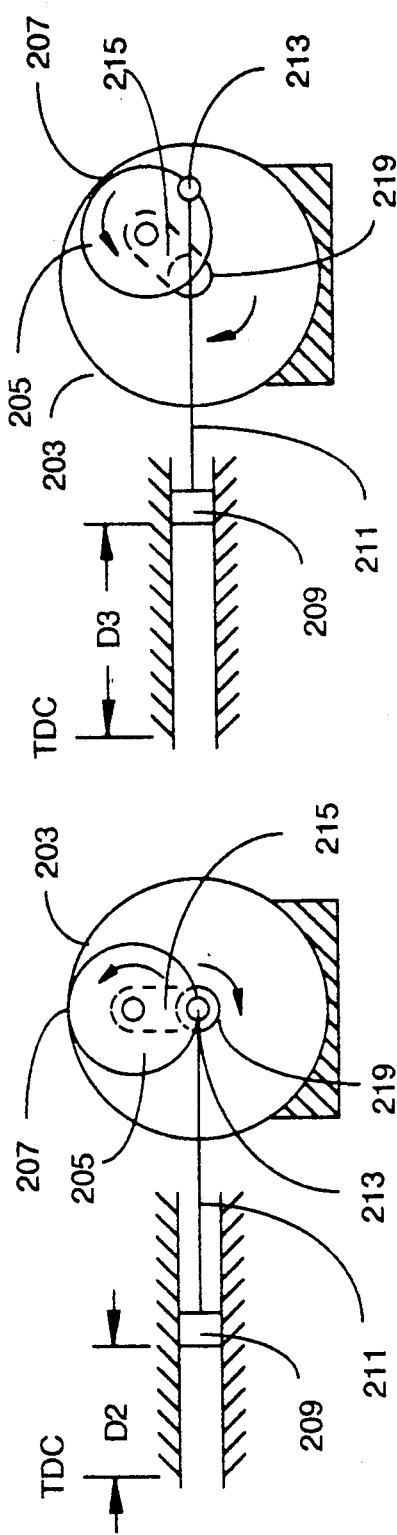
Figure 8D:
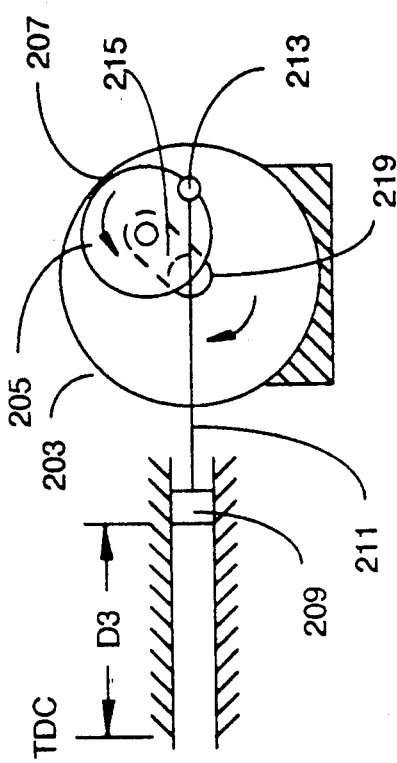

FIG. 8B shows the mechanical system of FIG. 8A after the drive shaft has rotated about 45 degrees from the position of FIG. 8A. The pitch circumference of ring gear 203 is twive that of flying crank gear 205. The point of mesh between to two gears has removed 45 degrees along the ring gear and 90 degrees along the flying crank gear. Since the flying crank gear is rotating counter-clockwise relative to the system and the crank is rotating clockwise, the net rotation of the flying crank gear is 45 degrees. At the position shown by FIG. 8B gear 205 has rotated about 45 degrees, and piston 209 has moved a distance D1 away from TDC. FIGS. 8C, 8D, 8E, 8F, 8G, and 8H show successive positions assumed by the associated elements of the engine as rotation of the drive shaft proceeds in intervals of 45 degrees. The 2:1 relationship between the flying crank gears and the ring gear allows the connecting rod to travel in a straight line while the crank rotates, an advantage that allows the unique long stroke to the accomplished with a minimum throw.

Counterweights 133 and 139 are devised and placed to exactly balance dynamically the rotation forces associated with the flying crank gears. Counterweights 107 and 109 on the flying cranks rotate around the drive shaft centerline in the opposite rotational direction to the drive shafts, creating centripital effects equal and opposite the effects created by the two pistons and the connecting rod fixed between them, so the LS engine may be effectively and efficiently dynamically balanced, avoiding any vibrational effects of imbalanced moving parts.

The LS engine is a two cycle engine. All power, exhaust, intake and compression take place in one rotation of he central crank. At about the position shown in FIGS. 4 and 5, near TDC, compression has proceeded to the point that the charge of air that was intoduced earlier to the frontside of the piston shown in superheated. Fuel is injected through a unit injector 193 near this point. The plunger is operated by rocker 195 around pivot 199 by action of pushrod 149. Bracket 197 carries fuel rocker 195. Pushrod 149 extends the length of the cylinder, guided through the various crossmembers, and bears on cam 141 which is fixed to drive shaft 57. The cam is machined in a profile to ibject fuel near TDC for the length of time need to assure the desired amount of fuel. In production engines fuel injection may be provided by electronically actuated means well known in the art. Fuel injection is controlled to produce an initial pressure and temperature increase followed by a short, substantially constant-pressure burn. The expanding gases exert pressure on piston 87 producing driving force. As piston 87 moves toward the crank assembly in the power-expansion stroke, the opposing piston at the opposite end of the connecting rod is in the exhaust-compression stroke. The unique long stroke allows the pressure on the piston frontside to be reduced substantially, from about 3000 psia to about 31 psia before the exhaust valve opens near bottom dead center. The important of the long expansion will be discussed subsequently with respect to the air flow and thermodynamics of the engine.

Near bottom dead center (DBC) exhaust valve 187 opens. The valve is operated against valve spring 185 by rocker 189 around pivot 191 by pushrod 147. Bracket 179 carriers the exhaust rocker. The pushrod extends the length of the cylinder shown and bears against cam 135 (FIG. 7A and 7B). The exhaust cam is machined to open the exhaust valve at a point near BDC and to hold it open until a point about two thirds through the exhaust compression stroke, at which point it closes again by action of spring 185.

In the prototype engine, the exhaust valve is controlled entirely by the action of cam 135 through pushrod 147. In the preferred embodiment, as the engine will be used in an aircraft or other application, the exhaust valve will open mechanically by action of cam 135, but the point in the cycle that the valve will close will be controlled electronically. This is accomplished by shaping cam 135 so that the exhaust valve will tend to close at a point earlier in the cycle than will ever be required (urged by spring 185). An electronic actuator 225 (FIG. 4) mounted to the LS engine near the exhaust rocker arm 189 has an extensible cog 227 which is controlled to extend just after the exhaust valve opens, so the exhaust valve is held open after pushrod 147 retracts. Control line 229 is an output from on-board computer 22 that controls certain flight functions. Cog 227 is extended and retracted by a computer generated signal in response to such variables as power setting, altitude and temperature. The closing of the exhaust valve is typically controlled through a range from a position of the piston where the volume to be compressed is about 980 cubic centimeters (about 67 cubic inches) to a position where the volume to be compressed is about 2050 cubic centimeters (about 125 cubic inches).

Also in the preferred embodiment an electronic actuator 231 (FIG. 4) will be used to control the timing and amount of fuel injection for the LS engine. Control line 233 is an output from the on-board computer to control fuel injection. During the expansion-power stroke to BDC, the air on the backside of the piston between the piston and breather block 73 is somewhat compressed by the diminishing volume, and the pressure increase opens out-valve 161 allowing air to be moved by the pumping action of the piston through air channel 167 of the breather block and thence into cooler volume 171 which is connected through channel 173 to a space surrounding the base of the cylinder. In practice, there are a plurality of such valves to avoid flow restriction in operation. As BDC is approached, camtrack grooves 145 and 143 in counter weights 133 and 139 respectively engage cover valve operating rods 153 and 154 moving these rods toward the crankcase against springs 155 and 156 respectively. The cover valve operating rods are attached to a cylindrical cover valve that surrounds piston liner 79 near the bottom of the cylinder. The sliding cover seats against spacer block 75 and covers multiple openings through the cylinder liner around the periphery of the liner. As the cover valve slides toward the crank, these openings are exposed, and the cooler volume opens to the frontside of the cylinder, allowing the mass of cool air that was pumped by the backside of the piston to flow into the frontside to become the next volume to be compressed for combustion. Although not shown, the second cylinder is connected to the cooler volume in the same manner as the cylinder shown, and also pumps air for combustion the same way.

As the piston reverse direction past BDC the cover valve closes by action of the springs and the configuration of the cam profiles associated with the central crank counterweights. The exhaust cam holds the exhaust valve opeen for the first portion, approximatelt two thirds, of the exhaust-compression stroke, and the cool air admitted forces exhaust gases out of the cylinder through passage 183 as the piston advances. When the diminishing volume on the piston frontside is reduced to about 67 cubic inches, i.e. about 1100 cubic centimeters, the exhaust valve is allowed to close. Compressionm takes place from this point to substantially TDC. The action of the backside of the piston moving away from breather block 73 creates an expanding volume and decreasing pressure, which suction opens intake valve 157 against spring 159, bringing cooled air into the piston backside volume through channel 165 in the breather block and inlet cnduit 169. This is the air from the compressor in the TCF section of the LST system. This air is the next volume to be pumped by the backside piston action through cooler valume 171. At about TDSC spring 159 closes the intake valve. Again, there are multiple intake valves in the prototype engine to avoid flow restriction.

All of the actions detailed above for the operation of one piston and cylinder of the LS engine are duplicated by the opposite piston, which has corresponding elements to those involved with the first piston. The actions of the opposed piston are 180 degress out of time phase with the actions of the first piston. While the first piston is in the exhaust compression stroke, the opposite piston is in the expansion-power stroke, and while the first piston is in the expansion-power stroke, the second is in the exhaust compression stroke. There are thus two power strokes for each full rotation of the drive shafts. Flywheels 65 and 71 provide inertia for smooth operation. The exhaust gases from the LS engine are conducted back to the TCF section of the LST system, where they are further expanded through the turbine portion of turbo-compressor 23, (see FIG. 1), providing power for the fan and compressor. The exhaust then flows through an exhaust pipe that passes through radiator 25 in the TCF section and exists through nozzle 27 to provide additional thrust.

Heat from the LS engine is removed by coolant flow through water channels 201 and 85, FIG. 4, and other channels not shown, and the coolant thus heated, under a "no ice" condition, goes to radiator 25 where the heat energy is added to the original incoming air that is not bypassed through the turbo-compressor to the LS engine. The heated air expands and exits through nozzle 27 to provide thrust.

Figure 9A:
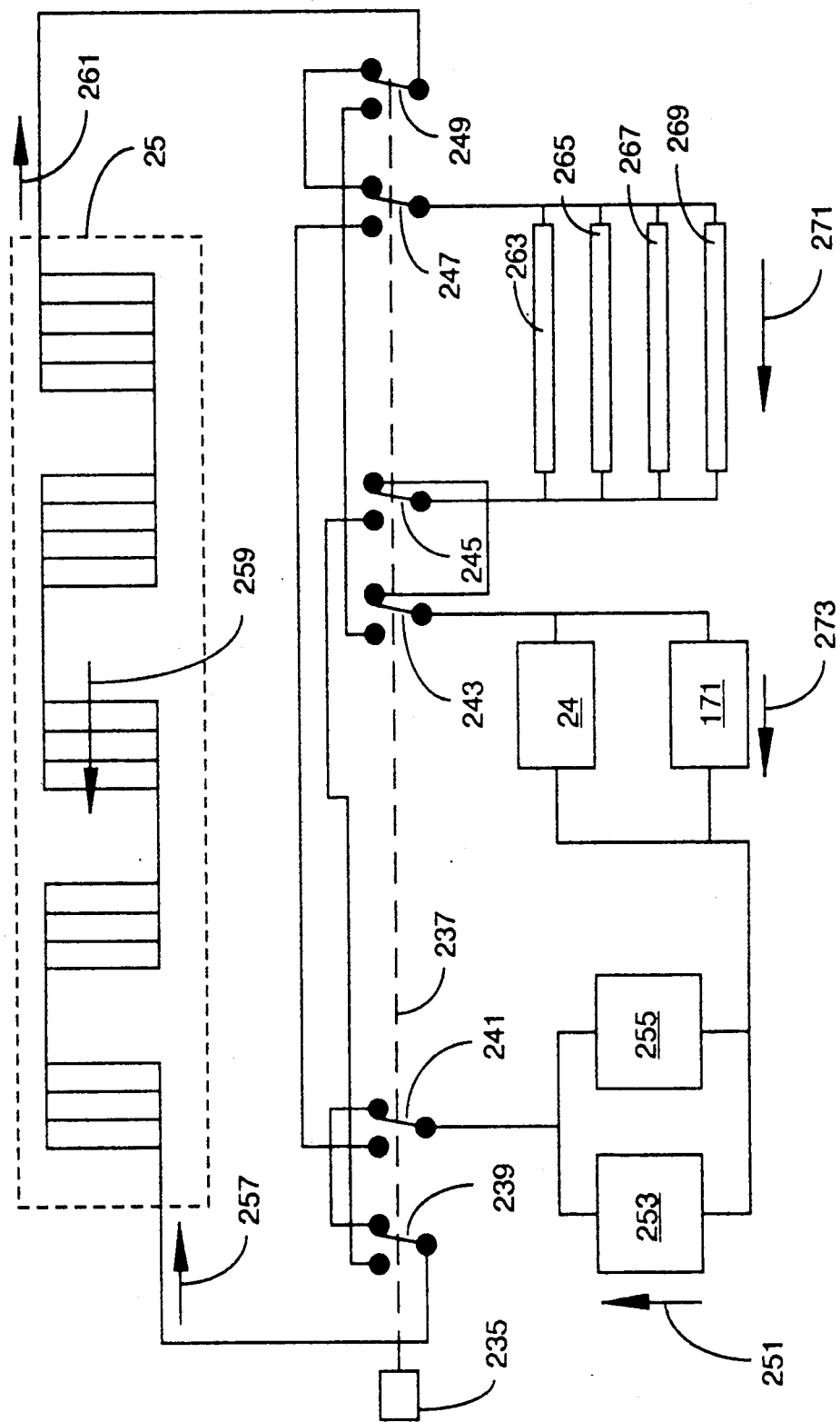
FIG. 9A is a coolant flow diagram for the long stroke turbine engine under no-ice conditions.

FIG. 9A is a coolant flow diagram showning the paths of closed-circuit coolant flow for the LST propulsion system under operating conditions sensed and signalled by the on-board flight computer as "no ice". Sensors not shown sense variables such as outside air temperature. The computer controls a valve actuator 235 that operates six valves through a mechanical connection represented by line 237. In the "no ice" position shown in FIG. 9A, coolant flows in the direction of arrow 251 in parallel through blocks 253 and 255, which represent respectively the coolant channels in the cylinder heads and in the cylinder sleeves of both the cylinders of the LS engine. The coolant absorbs heat from the engine and passes through valve 241, then through valve 239 and enters radiators 25 following arrow 257. The coolant gives up the thermal energy gained from cooling the LS engine to the air stream passing through the TCF section (arrow 259), then exits the radiator at a lower temperature in the direction of arrow 261.

Coolant from the radiator passes through valve 249 then through valve 247, and flows to the wing leading edges 263 and 265 and the canard leading edges 267 and 269. This flow is in parallel, and in the direction of arrow 271. The coolant is supercooled by this passage through the wing and canard leading edges.

From the wing and canard passages, the coolant flows through valve 245 and 243, and then in parallel through cooler 24 and cooler volume 171, where the air stream going to the LS engine is cooled prior to entering the cylinders. This flow is represented by arrow 273. From the cooler and the cooler volume, the coolant flows back to the LS engine again, completing the closed loop cycle of coolant flow. This heat management by carefully planned coolant flow increases the efficiency of the LST system. The heat from cooling the engine cylinder sleeves and head liners, that is wasted in most engines, is conducted to the TCF section to radiator 25, where the heat energy is added to the air flow through the turbine duct, supplying additional thrust. Head and cylinder liners are made preferably of high nickel-chromium content alloy with a coefficient of heat conduction about 1/6 that of cast iron. This material also has better high temperature strength than cast iron. This material reduces heat losses from the engine. Additionally, as it is well known in thermodynamics that efficiency for an engine is related to the magnitude of the difference between the low temperature for the gas passing through the engine and the high temperature, and the high temperature is constrained and limited by the nature of the materials of construction for the engine, supercooling the gas stream going to the engine helps to increase the engine efficiency.

Figure 9B:
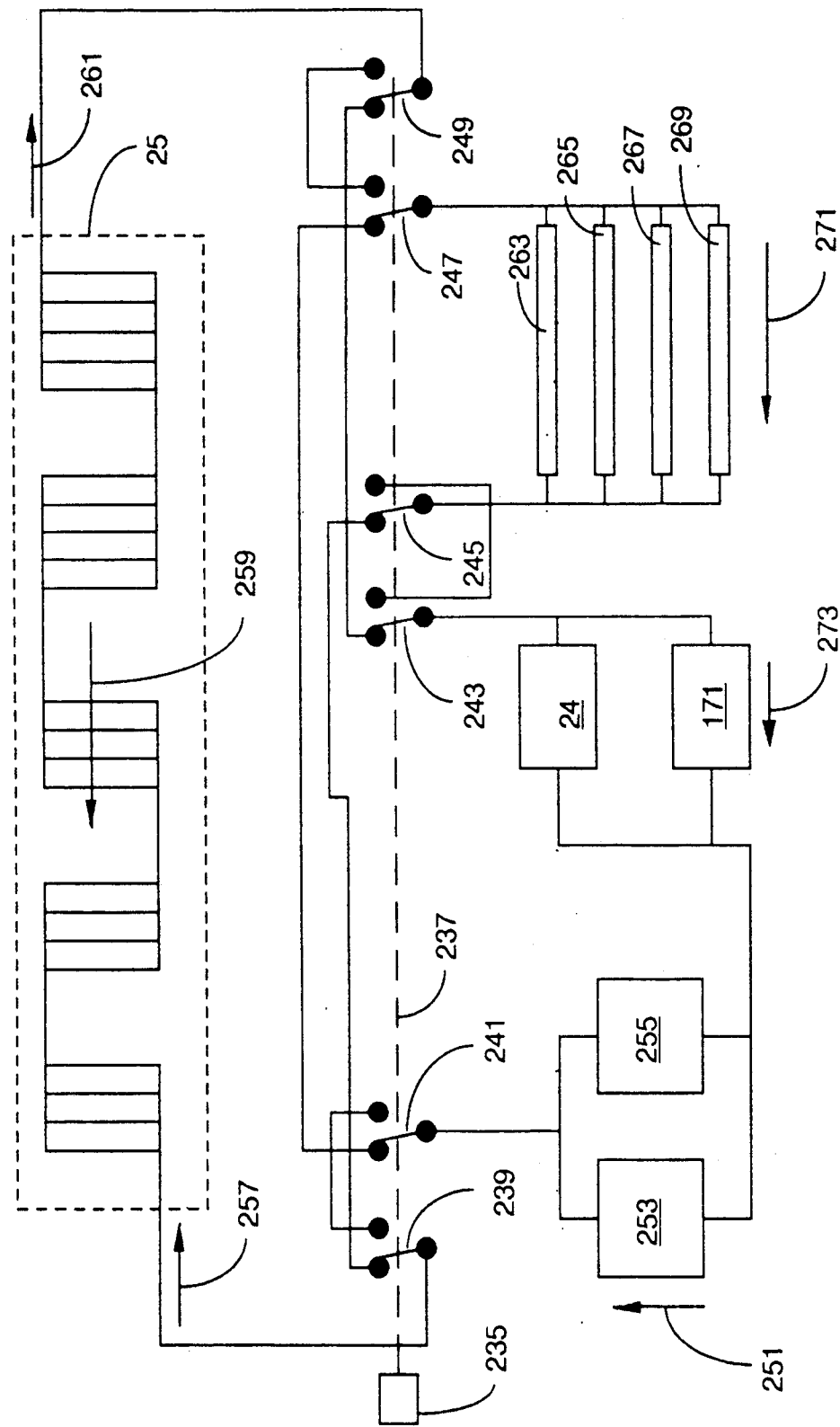
FIG. 9B is a coolant flow diagram for the long stroke turbine engine under de-ice conditions.

During flight conditions sensed by the on-board computer to be conducive to buildup of ice on the conard and the wing surfaces, a signal is sent to ice valve actuator 235 to switch valves 239, 241, 243, 245, 247, and 249. This condition is shown by FIG. 9B. Coolant leaving the LS engine with heat from the engine flows through valve 241 then through valve 247, and directly through the wing and canard leading edges 263, 265, 267 and 269 where the engine heat is used to de-ice the canard and the wing. Flow is then through valve 245 and 239 and to and through radiator 25. Exiting the radiator, flow goes through valve 249 and 243 to the cooler and the cooler volume, and then back to the LS engine.

Figure 10:
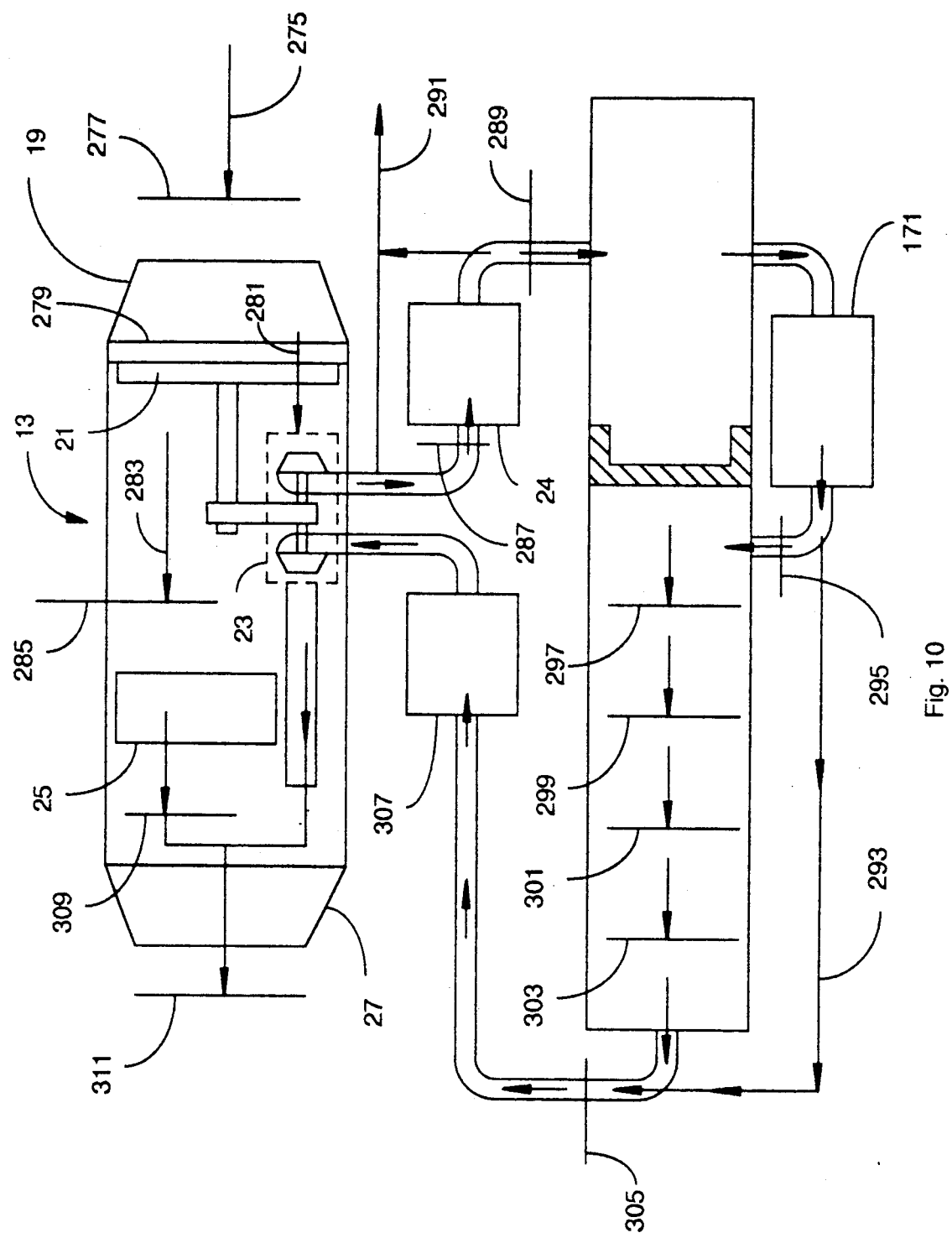
FIG. 10 is a diagram of air flow through the long stroke turbine engine under typical cruise conditions.

FIG. 10 is a diagram of air flow through the LST propulsion system under cruise conditions indicating typical states of air streams at a number of significant points throughout the system from induction at the entrance of the TCF duct to expulsion at the duct nozzle. Cruise conditions are taken as 36,000 ft. altitude and 630 ft. per second air speed (about 430 miles per hour).

For purposes of characterizing the state of air streams throughout the LS engine, up to five characteristics are stated at most points of interest:

W = mass rate of flow; expressed in pounds mass per second

P = Pressure; expressed as pounds per square inch absolute

T = Temperature; expressed as degrees Rankine

V = Volume rate of flow; expressed as cubic feet per second

S = Velocity; expressed as feet per second. The capital letter representing the characteristic will be generally stated along with a number, and the units of measure are those listed here. For example: in FIG. 10, air entering TCF section 13 through diffuser 19 is represented by arrow 275. This air stream, crossing a plane 277 near the entrance to the diffuser section has the characteristics: W = 7.72, P = 3.2, T = 393, V = 351, and S = 630. After the diffuser section, at plane 279, no air has been diverted from the stream, so the mass flow rate is unchanged. W = 7.72. The pressure is somewhat increased because the diffuser decreases the velocity, converting some of the original kinetic energy to pressure and temperature increase. P = 3.68. The temperature is increased as well. T = 409. The diffuser decreases both the volume flow rate and the velocity of the air stream. V = 317 and S = 450.

The air stream passes through fan 21, which is driven by turbine-compressor 23. The fan has an efficiency of 0.85. After the fan the pressure and temperature are increased, and a portion of the pressurized air stream is diverted into the entrance to turbine-compressor 23. Arrow 281 represents the diverted portion of the incoming air stream, and the characteristics at the entrance to the compressor portion of the turbo-compressor are: $W=0.76$ (about 10 percent of the original air stream), $P=4.79$, $T=441$, and $V=25.9$. The remaining portion not diverted to the turbo-compressor continues through the TCF duct, and is represented by arrow 283 crossing plane 285. At that point the pressure and temperature are the same as at the entrance to the turbo-compressor, $P=489$, and $T=441$. The mass flow and volume flow are reduced by the diversion of air into the turbo-fan. $W=6.96$, $V=237$.

The air entering the turbo-compressor is compressed by the compressor portion using 67 horsepower delivered by the turbine portion of the turbo-compressor, and goes mainly to cooler 24. The compressor operates at an efficiency of 0.75%.

The cooler is a heat exchanger through which liquid coolant flows that has passed through the leading edges of the canard and the main wing (to supercool the fluid). Heat is added to the air stream by compression at the compressor and heat is removed at the cooler. As indicated earlier, a reason for cooling the airstream, which is going to the LS engine, is that efficiency of the engine is improved by maintaining a larger difference between the high and low temperatures of the working gas through the engine. The high temperature is fixed by material constraints. Characteristics entering the cooler (plane 287) are: $W=0.75$, $P=12.2$, $T=623$, and $V=14.18$. After the cooler (plane 289) the mass flow rate W is not changed, but pressure is decreased slightly, $P=12$, temperature is lowered considerably, $T=420$, and $V=9.71$. A small volume flow rate of air is diverted both ahead of and after the cooler, the two diverted streams mixed, to provide cabin pressurization and ventilation. This stream is represented by arrow 291, for which $W=0.009$, $P=11$, $T=530$, and $V=0.16$. The heat transfer energy rate at the cooler has a mechanical equivalent power of 51.79 Horsepower.

The airstream from the cooler is introduced through intake-valve 157 (not shown-see FIG. 4), to the backside of the pistons of the LS engine, which act as pumps to increase the pressure of the air stream to be introduced to the combustion chambers of the LS engine. For illustration, only one piston is shown, while in the preferred embodiment there are two pistons, both of which act as air pumps. This unique feature has the same effect as a supercharger used in other well known internal combustion engine applications.

Air exits the backside piston pump through out-valve 161 (not shown). After compression (plane 291) the mass flow rate is unchanged at $W=0.75$, pressure is increased to $P=31$, temperature is increased to $T=538$, and volume flow rate is 4.81. The air goes from the piston backside to cooler volume 171, where the liquid coolant again removes heat, lowering the temperature of the gas stream. The heat removed by the cooler volume has a mechanical equivalent of 32.75 Horsepower, and after the cooler volume the pressure is unchanged, $P=31$, but the temperature is lowered to $T=410$.

Some of the air introduced into a cylinder is exhausted in the initial stroke of the piston toward the cylinder head before the exhaust valve closes, along with air and products of combustion from the previous power stroke. This air is represented by path 293 shown bypassing the LS engine cylinder.

The LS engine is an internal combustion engine, and has a well defined cycle of changes of state of the air and products of combustion in the cylinders through the repeating cycles of compression, combustion, and power (expansion). Air typically enters the cylinder at plane 295 where $W=0.62$, $P=31$, $T=410$, and $V=3.06$. This pressure is about 2 atmospheres, and the temperature is 50 degrees below zero Farenheit. Four planes are shown within the cylinder to represent specific states of the gases in the cylinder during the thermodynamic cycle. Plane 297 represents the state after compression just before fuel is injected for combustion. At this point $W=0.62$, $P=1021$, $T=1073$, and $V=0.25$. Pressure and temperature are significantly increased by the compression. It is important to note that the pressure and temperature at this point are a function of the point in the forward stroke of the piston at which the exhaust valve closes. The timing of the closing of the exhaust valve can be controlled in the preferred embodiment by the on-board flight computer.

Plane 299 represents the state immediately after fuel injection and ignition. Pressure increases by almost a factor of three to $P=3000$. Temperature increases to $T=3153$, also a factor of about three. As the cylinder moves away from Top Dead Center while burning continues, the pressure remains substantially constant. Plane 301 represents the state at the completion of the constant pressure burn, which also can be managed by the fact that in the preferred embodiment the timing and the amount of fuel injected is controlled by the on-board computer. At the completion of the constant pressure burn, $W=0.62$, $P=3000$, $T=4475$ (significantly increased), and $V=0.35$.

From the completion of burn to Bottom Dead Center is an isentropic expansion, for which the pressure decreases to a pressure slightly below the pressure of the gas in the cooler volume. Because of this pressure decrease with the uniquely long stroke, a new air charge will flow into the cylinder when the cover valves open at the bottom of the stroke. This state is represented by plane 303 in FIG. 10. At this point, $W=0.62$, $P=30.8$, $T=1555$ (much reduced by expansion), and $V=11.73$. The long stroke and the resulting low pressure at BDC are unique to the LS engine. Conventional internal combustion engines reach Bottom Dead Center at a pressure very much higher, and the exhaust valve in these engines is opened at BDC resulting in a sudden expansion into the exhaust passages with an accompanying loss of available energy that cannot be salvaged to do useful work. The exhaust noise of such engines is a result of shock waves from the repeated opening of the exhaust valves at high cylinder pressure. The LS engine does not exhibit this objectionable exhaust noise.

Plane 305 represents the state of the air stream in the exhaust line after the LS engine cycle. At this point the air passed through with the exhaust stroke, represented by path 293, has rejoined the portion of the input air stream that passes through the LS cycle. $W=0.75$, $P=30.8$, $T=1364$, and $V=12.3$. The flow is then to a reservoir volume 307 without significant change of state. From the reservoir volume, flow is into the turbine portion of turbo-compressor 23. The exhaust gases expand through this turbine, driving both the compressor portion and the fan. Under cruise conditions the turbine produces about 163 horsepower at 0.85 efficiency. About 64.7 Hp goes to compress air for the cabin and the LS engine and 98.3 Hp goes to the fan. If this power went to the main prop at 0.85 efficiency, it would add 73 pounds thrust. By forcing air through the radiator and nozzle, picking up additional heat energy from the radiator, thrust is 98.5 pounds.

The air entering the TCF duct and not diverted into the compressor for the LS engine (plane 285), passes through radiator 25. Coolant passes through this radiator immediately after leaving the coolant passages of the LS engine (under "no ice" conditions), and energy is transferred to the cold air stream (T=441; about 19 degrees below zero farenhiet). At plane 309, just after the radiator the air stream of the duct has these characteristics: W=6.96, P=4.72, T=538, V=293, and S=557.

The heated air stream expands, is joined by the exhaust from the turbine, which bypasses the radiator, and the joined stream exits through nozzle 27. At plane 311, after expansion through the nozzle, W=7.72 (the same as at the entrance), P=3.2 (the same as at the entrance), T=523 (about 63 degrees Fahrenheit), and S=1016. The very modest temperature increase in the exhaust attests to the efficiency of the system, and the mass flow with a velocity increase from 630 ft. per second to 1016 ft. per second provides 92.5 pounds of thrust at the cruise condition.

Conventional piston-engine aircraft exhibit a specific fuel consumption (sfc) of about 0.40 pounds of fuel per horsepower-hour (lbs/HpHr). The water cooled engine in the well known voyager aircraft that completed a non-stop around-the-world flight attained an sfc of about 0.36 lbs/HpHr. Large diesel engines exhibit an sfc of about 0.32. As a comparison, the LST propulsion system in the preferred embodiment at stated cruise condition attains an sfc of 0.25 lbs/HpHr, according to test results on a prototype single cylinder LS engine and careful computer simulations of the system. This exceptional fuel efficiency makes possible a savings in weight for the aircraft and fuel for a 2800 mile trip of 1000 pounds over a comparable conventional aircraft and power plant. There are three fundamental reasons why the LST system achieves such an exceptionally low sfc. First, the LS engine has thermodynamic cycle that is more efficient than either the Otto cycle or the Diesel cycle. Second, the use of intercooling, providing a low temperature for heat rejection, keeps efficiencies high despite material limitations on high temperature and pressure. Third, the TCF jet, which operates and provides thrust from the exhaust stream and from the heat extracted from the LS engine by the liquid coolant system.

Figure 11B:
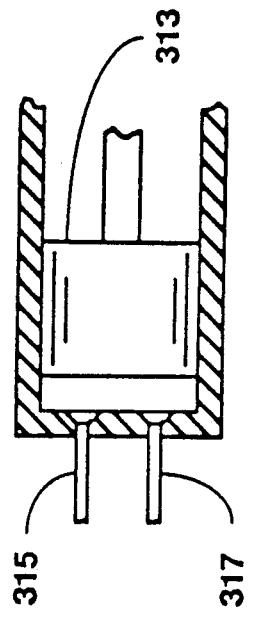
FIGS. 11A–11D show four states of a typical OTTO cycle for comparison with the thermodynamic cycle of the invention.
Figure 11D:
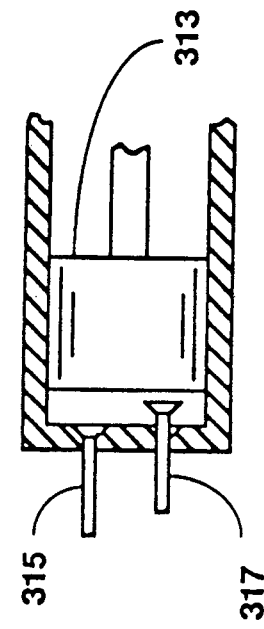
Figure 11A:
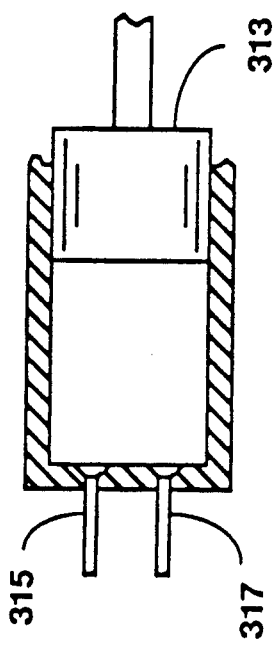
Figure 11C:
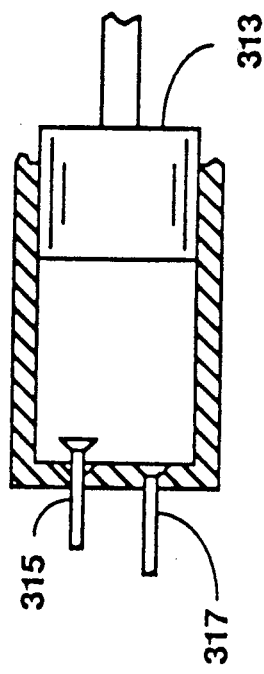

FIGS. 11A through 11D show four states of the common Otto cycle of a four stroke internal combustion engine. In FIG. 11A piston 313 is at BDC and exhaust valve 315 and intake valve 317 are both closed. This is the beginning of the compression stroke. FIG. 11B shows the piston at TDC near the point of ignition. This is the beginning of the power stroke. In FIG. 11C piston 313 has returned to BDC and exhaust valve 315 has opened. This is the beginning of the exhaust stroke. FIG. 11D shows the piston again at TDC and intake valve 317 has opened. This is the beginning of the intake stroke.

Figure 12A:
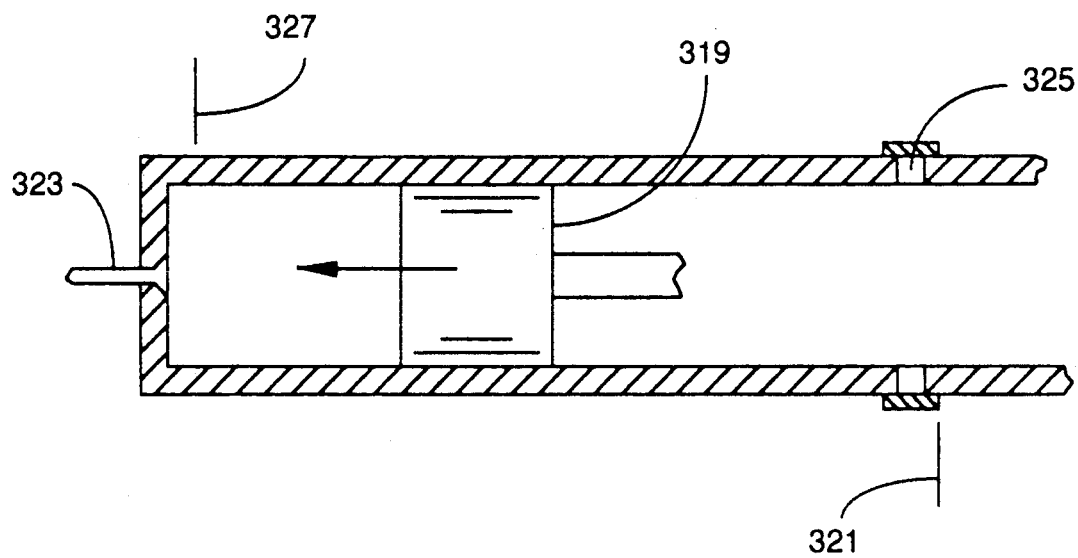
FIGS. 12A–12D show four states of the long stroke internal combustion engine.

FIGS. 12A through 12D show four states of the LS cycle. In FIG. 12A piston 319 is shown moving toward the closed end of the cylinder. The piston is about ⅔ of the way between BDC represented by line 321 and TDC represented by line 327. Exhaust valve 323 is shown closed. This is the point in the forward piston stroke for the LS engine that the exhaust valve closes and compression begins. This point is equivalent to FIG. 11A for the Otto cycle.

Figure 12B:
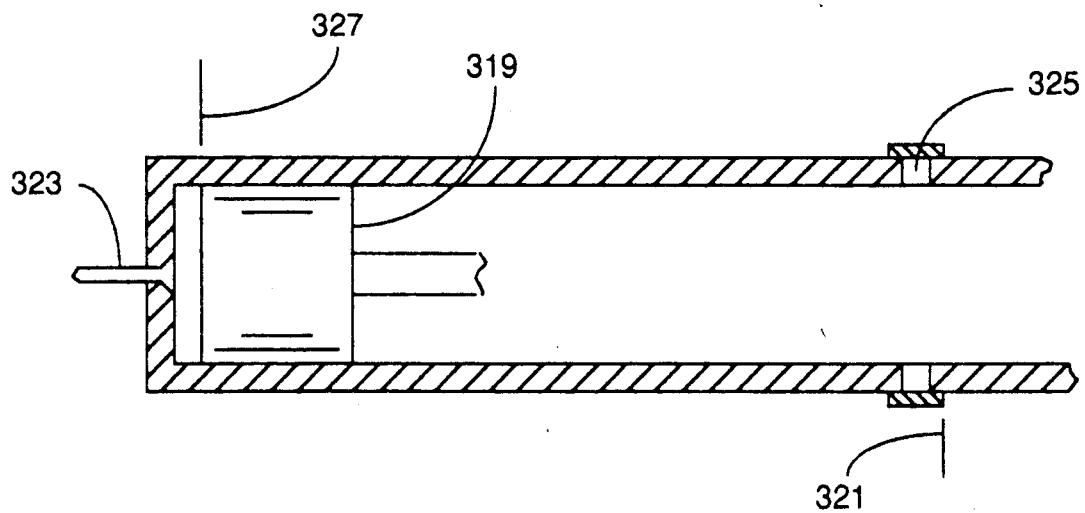
Figure 12C:
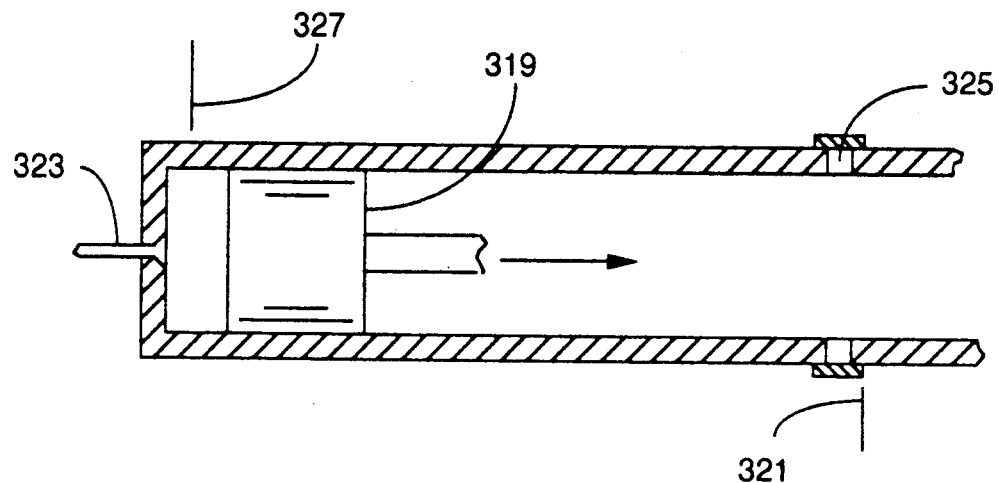

FIG. 12B shows the piston at TDC, the end of the compression stroke. This is equivalent to FIG. 11B for the Otto cycle engine. Near this point fuel that was injected before TDC ignites with a sudden increase in temperature and pressure, similar to the ignition in a spark-plug-fired engine. Additional fuel injected after TDC causes a short constant pressure burn for the LS cycle. The end of the burn is represented by FIG. 12C. The piston is moving away from the head end of the cylinder, and has moved a small distance. At the state represented by FIG. 12C, the burn is complete and isentropic expansion has begun.

Figure 12D:
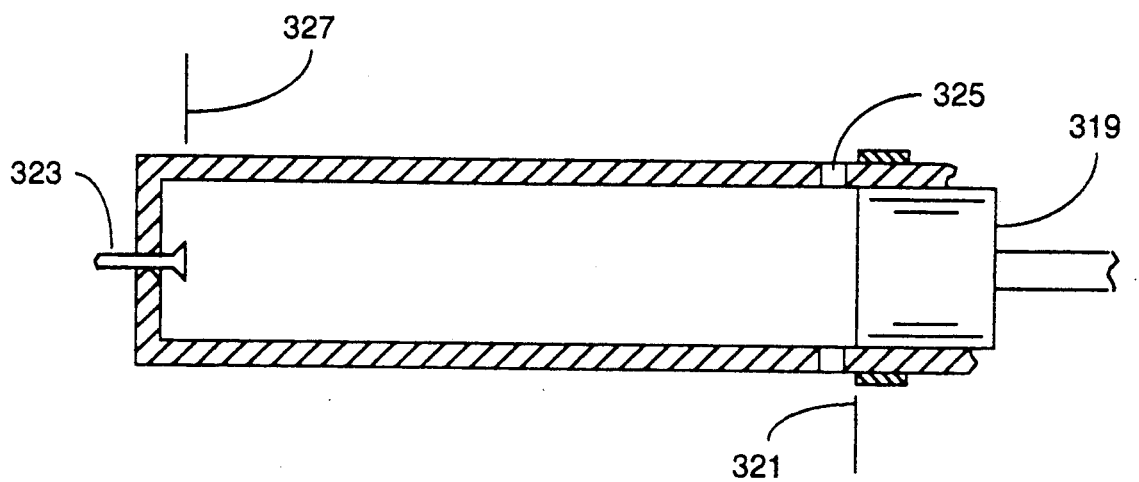

FIG. 12D represents the state at the end of the expansion (power) stroke, at BDC. In the case of the LS engine, the expansion stroke is significantly longer than the compression stroke. The compression stroke is about a third of the length from BDC to TDC, and the expansion stroke is nearly the entire length from TDC to BDC. The point at which the exhaust valve closes is controllable by the on-board computer. The closing time for the exhaust valve is typically set to make compression start pressure (FIG. 12A) equal to expansion end pressure (FIG. 12D). At cruise condition this typically makes the expansion stroke length 3.8 times the compression stroke length. This difference is important in comparing the cycles for a typical Otto cycle and the LS cycle.

Figure 13A:
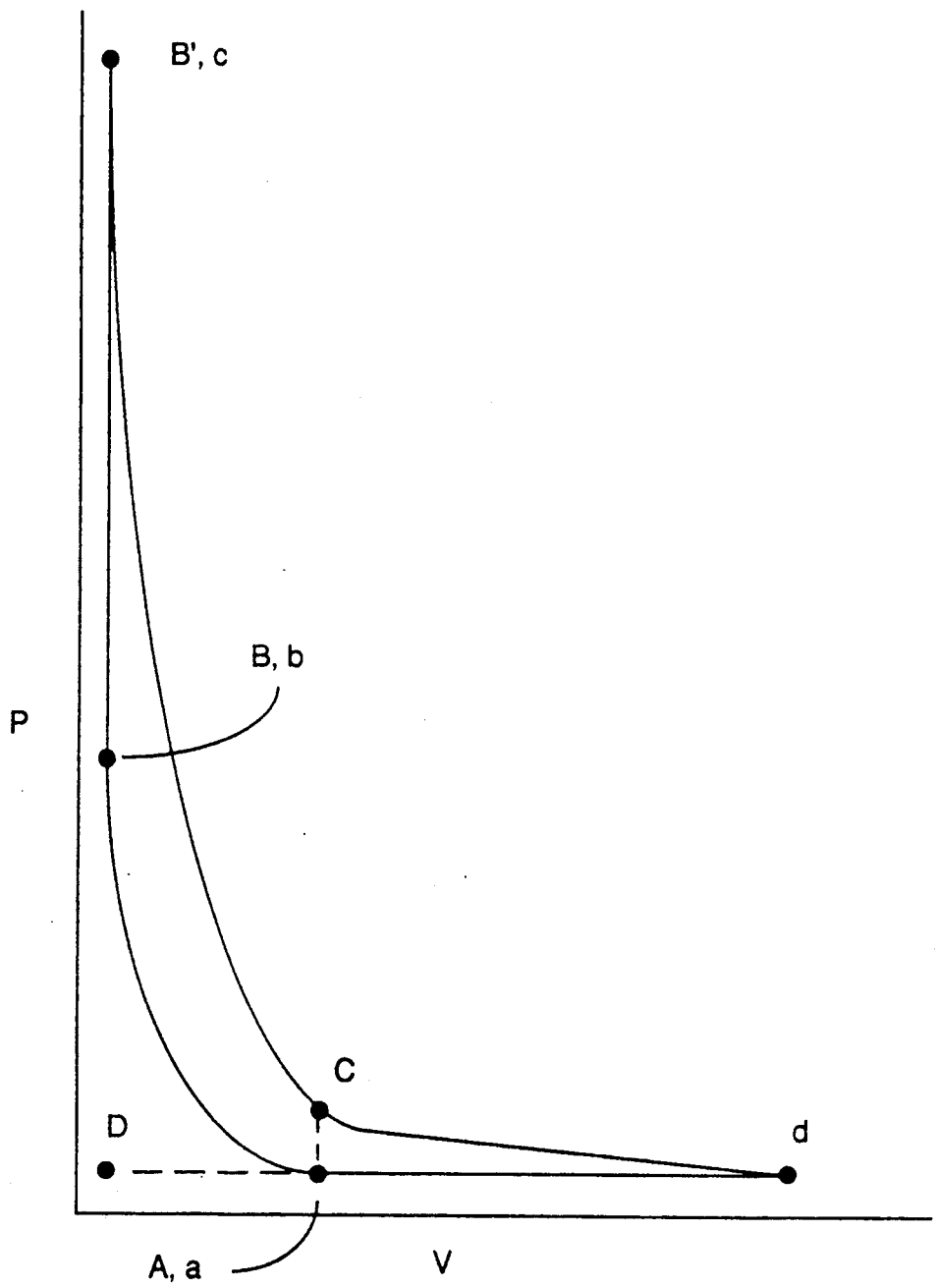
FIG. 13A shows a PV diagram, comparing the thermodynamic cycle of the invention with the OTTO cycle.

FIG. 13A is a PV diagram, which is a well known device in thermodynamics for showing work done on a system and by a system, and the net work. The idealized Otto cycle and the idealized LS cycle have been superimposed. The fuel burn for the LS cycle is shown as entirely a burn at constant volume for the idealized case. State points in the Otto cycle are represented by uppercase letters corresponding to FIGS. 11A through 11D. State points in the LS cycle are represented by lowercase letters corresponding to FIGS. 12A through 12D. Point "A,a" represents the beginning of compression for both cycles.

Compression proceeds with an increase in pressure and a decrease in volume along superimposed curves A-B for the Otto cycle and a-b for the LS cycle. Fuel burn is B-B' for the Otto cycle and b-c for the LS cycle. The significant difference is in the expansion stroke. For the Otto cycle, expansion is B'-C, back to the volume at the beginning of compression. C-A is an irreversible sudden expansion at the opening of the exhaust valve. A-D represents the exhaust stroke, pushing the remaining products of combustion from the cylinder. D-A is the intake, drawing in a new charge of air for the Otto cycle.

The expansion stroke for the LS cycle is from "c" to "d", back to the pressure at the beginning of compression. At "d", the cover valve opens and a fresh air charge enters the cylinder. From "d" to "a" the exhaust valve is open, and products of combustion plus some of the entering air charge are pushed out into the exhaust line, substantially at constant pressure. At "a" the exhaust valve closes and the cycle starts over. The area C-d-a-C represents net work for the LS cycle not available in the Otto cycle; and is a significant difference between the two cycles.

Figure 13B:
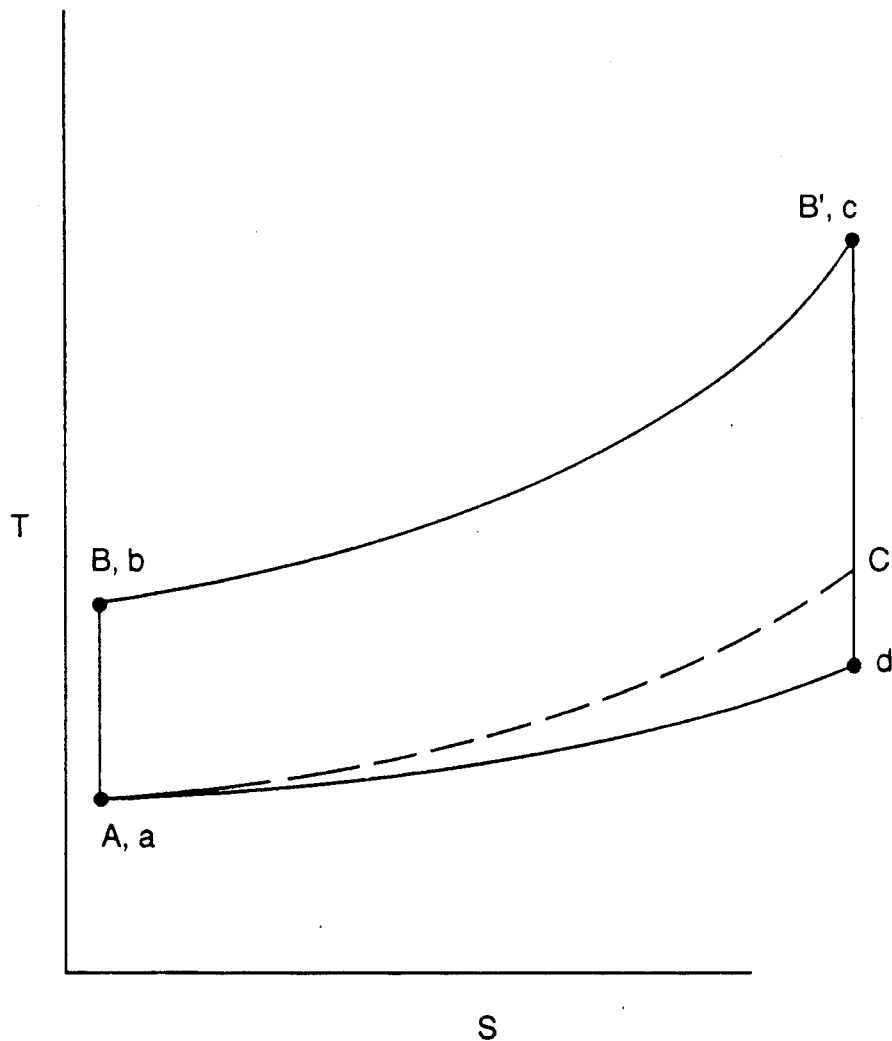
FIG. 13B shows a TS diagram corresponding to the PV diagram of FIG. 13A.

FIG. 13B is a T-S (temperature-entropy) diagram for the two cycles represented in FIG. 13A. The Otto cycle proceeds as follows: Isentropic compression A-B; fuel burn B-B'; isentropic expansion B'-C; and exhaust and intake C-A. For the LS cycle compression is a-b; fuel burn is b-c; expansion is c-d; and exhaust and intake is d-a. The significant difference is again in the extent of the expansion stroke. The expansion for the LS cycle finishes at a lower temperature than expansion for the Otto cycle (d vs. C). The area a-C-d-a represents heat rejected from the system in the Otto cycle, but not rejected by the LS cycle.

Figure 14:
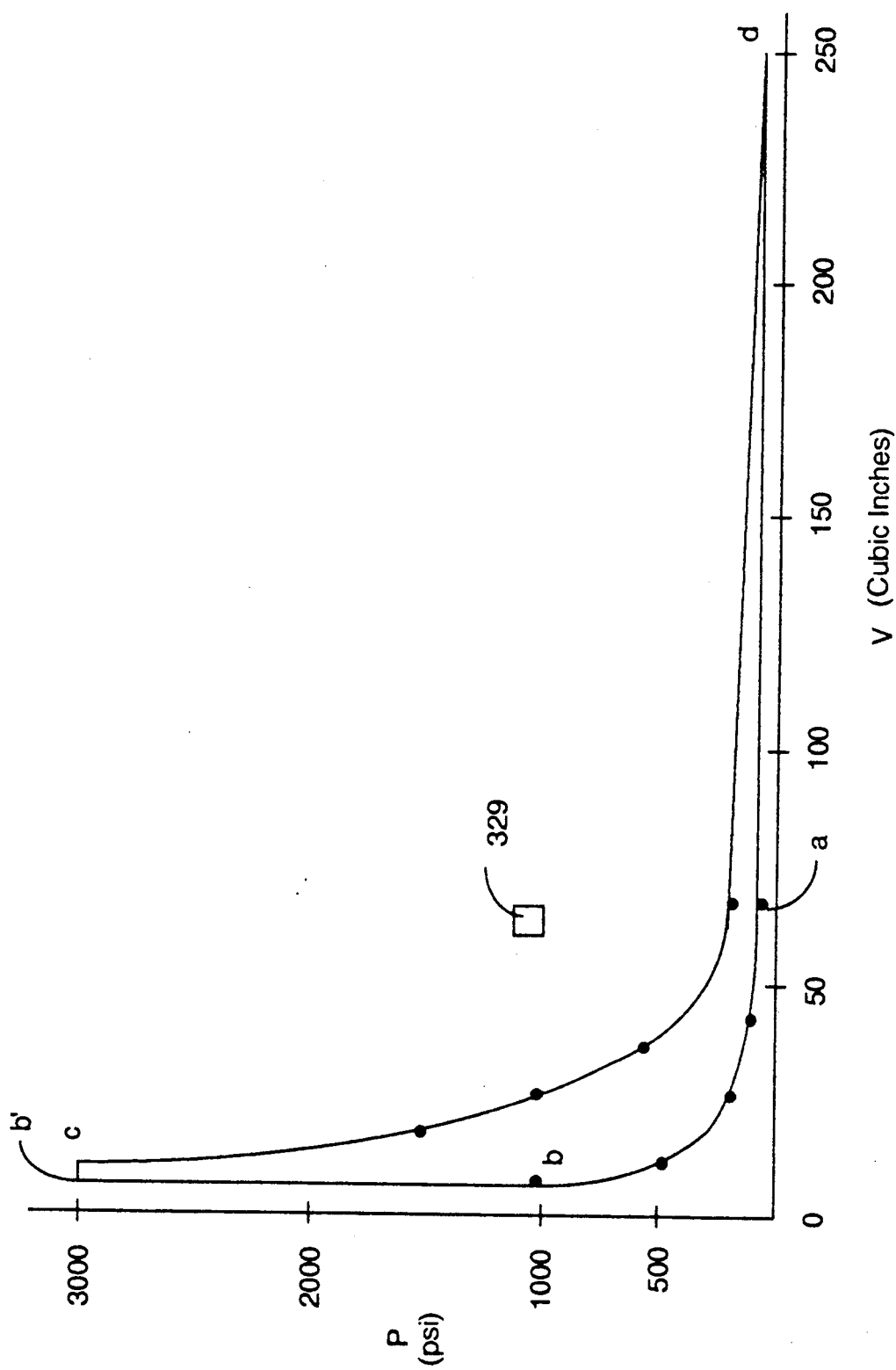
FIG. 14 shows the PV diagram, to scale, for the long stroke internal combustion engine using data taken from a computer simulation assuming cruise conditions.

FIG. 14 is a detailed P-V diagram to scale for the LS engine, the data taken from a computer model, the states corresponding to those in the text for FIG. 10 at cruise conditions. Point "a" is the beginning of compression, at the closing of the exhaust valve, and corresponds to the state conditions at plane 295 of FIG. 10, with a volume of about 1100 cubic centimeters. Point "b" is the end of the compression stroke and corresponds to the state at plane 297 of FIG. 10. Point "b'" is at the end of ignition corresponding to plane 299 of FIG. 10. Point "c" is at the end of a short constant pressure burn corresponding to plane 301 of FIG. 10. Point "d" is the end of the expansion (power) stroke, and corresponds to plane 303 of FIG. 10. The LS cycle differs in two ways from the Otto cycle. One is the short constant-pressure burn b'-c and the other is the extended expansion stroke of the LS cycle. In FIG. 14, rectangle 329 is an area representing 6.06 Hp at cruise condition.

Figure 15:
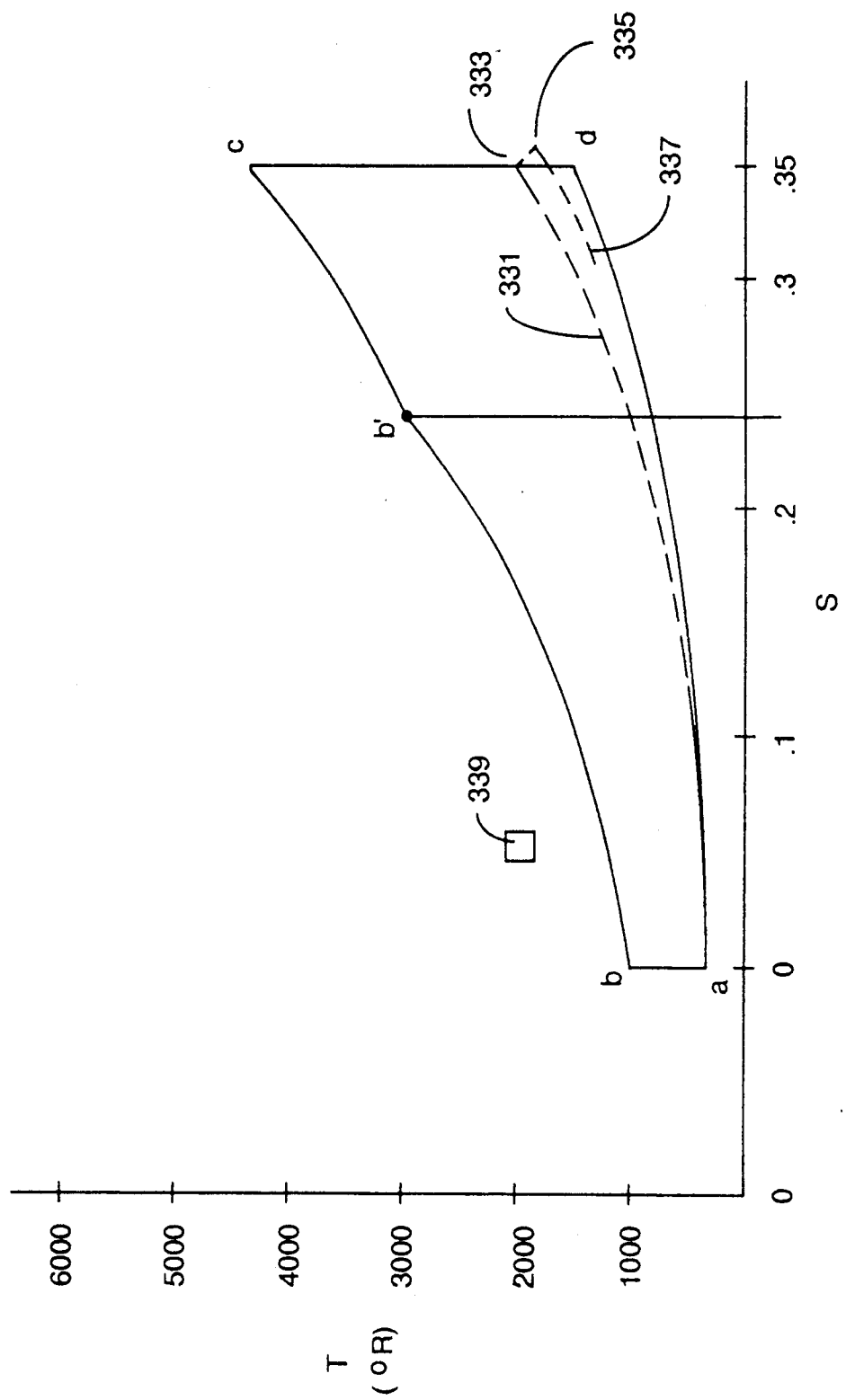
FIG. 15 shows a TS diagram corresponding to the PV diagram of FIG. 14.

FIG. 15 is a detailed T-S diagram to scale for the LS engine, data from the same computer model as for FIG. 14, under the same conditions. The cycle is a-b-b'-c-d-a, representing the same state conditions as in FIG. 14. Dotted line 331 represents the Otto cycle return under the same conditions as the LS cycle. For comparison, a turbo-charged Otto cycle return is shown as proceeding from "c" to point 333, to point 335, then return along line 337. The area of rectangle 339 represents cruise condition energy rate of 1.24 BTU per second, or 1.75 Hp.

Figure 16:
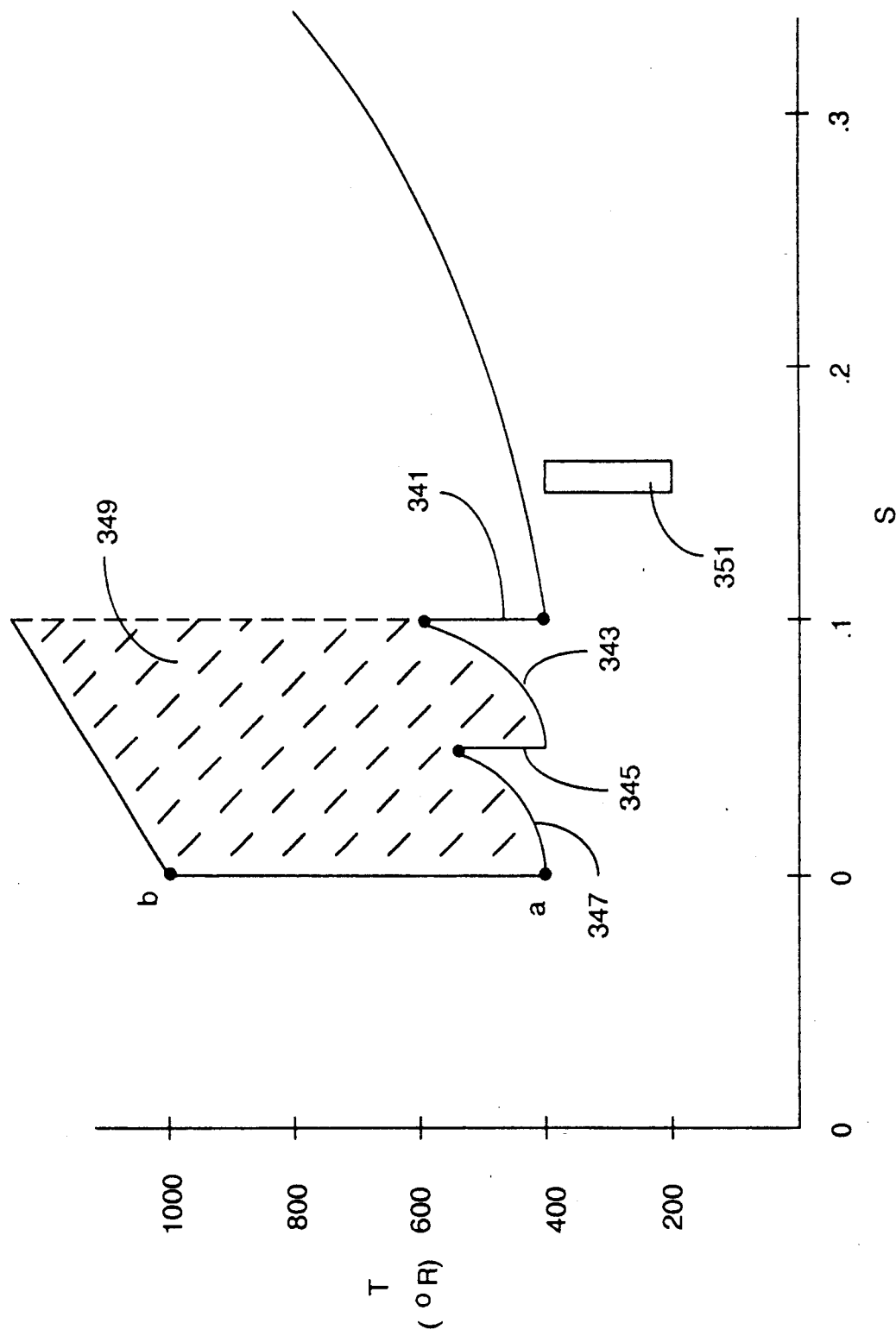
FIG. 16 shows a portion of the TS diagram of FIG. 15 on an expanded scale to illustrate the effect of intercooling.

FIG. 16 is an expanded portion of the nose of a T-S diagram for the LST system to show the effect of intercooling. The isentropic compression along line 341 is the effect of the compressor portion of turbo-compressor 23. Line 343 represents the effect of heat transfer in cooler 24. Line 345 represents the compression by piston backside pumping. Line 347 represents the effect of heat transfer in cooler volume 171. Area 349 is the additional area enclosed by the T-S cycle by virtue of the intercooling under cruise conditions and "no-ice" conditions. Rectangle 351 represents 1.75 HP under cruise conditions for the plot of FIG. 16.

Figure 17:
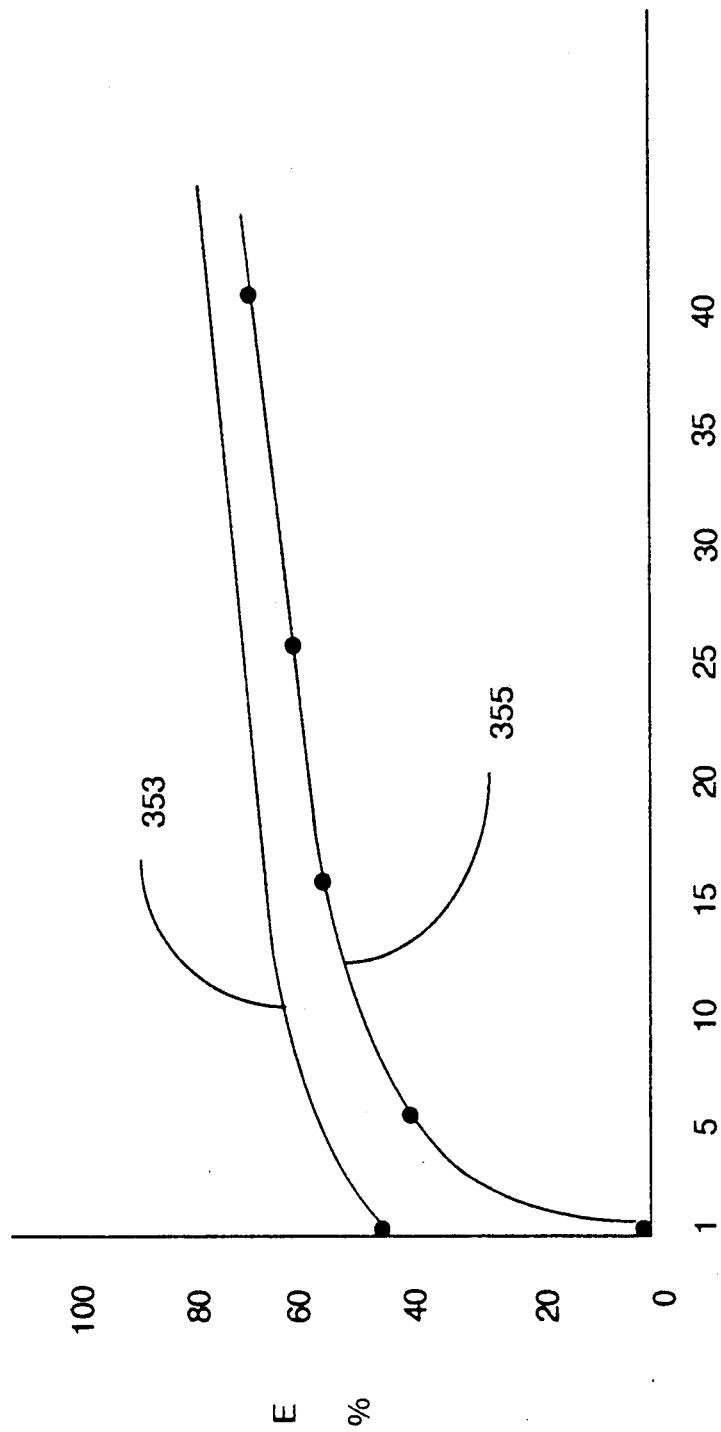
FIG. 17 shows a comparison of the efficiency for the long stroke cycle to the conventional OTTO cycle.

FIG. 17 is a plot of the efficiency E of the ideal theoretical LS cycle vs. compression ratio "r", along with the efficiency of the Otto cycle under the same conditions. Curve 353 is for the LS cycle and curve 355 is for the Otto cycle. The plots are from calculations using mathamatics developed in Appendix 1. Curve 353 is a plot of equation 28 of Appendix 1, and curve 355 for the Otto cycle is a plot of equation 14 of Appendix 1. The two equations are developed from the equations of state of an ideal gas and T-S plots for the two cycles. FIG. 17 shows that the efficiency for the LS cycle is higher than for the Otto cycle under these conditions at all compression ratios, and is much higher for compression ratios in the range of 1 to 15.

Appendix 2 is a list of engine specifications at full power for cruise conditions for the LS engine and for the LST system.

It will be apparent to those skilled in the art that changes may be made in many respects without departing from the spirit and scope of the invention. The materials, dimensions, thermodynamic states, operating conditions, and much more, may be changed considerably, but the inventive particulars are not altrered by such manipulations.

APPENDIX 1 CASE 1892

This Appendix is the mathematical analysis of efficiency for the LS cycle and the Otto cycle. In a thermodynamic cycle, the efficiency is defined as total heat input less total heat output, divided by total heat input, and these values are expressed as the areas under the curves of the T-S diagram. To arrive at a mathamatical expression, the well known equations of state of a perfect gas are used with the definition and the cyclic behavior of the particular cycle. Air is treated as a perfect gas, which is a close approximation, and values of various constants for air that vary in value with changes in state, are used as averages over the range of change in state. This is again a close approximation.

Q = Heat, BTU
W = Mass, pounds mass
$C_V$ = Constant volume specific heat for air, 0.22
$C_P$ = Constant pressure specific heat for air
(T2-T1) = Temperature difference in degrees Rankine
P = Pressure, pounds per square inch
V = Volume, cubic inches
R = gas constant for air, 53.28
T = Temperature, degrees Rankine
k = Ratio of specific heats $C_P/C_V$, 1.35 in temp. range For a perfect gas:
(1) $Q = WC_V(T2-T1)$ For a constant volume process
(2) $Q = WC_P(T2-T1)$ For a constant pressure process
(3) $PV = WRT$
(4) $PV^k$ = Constant for an isentropic process

Otto Cycle

From the T-S plot for the Otto cycle, FIG. 13B of the LST specification, and using equations (1) and (2) the efficiency (E) for the Otto cycle is:

$$E = (WC_V(TB'-TB) - WC_V(TC-TA))/WC_V(TB'-TB) \quad (5)$$

Simplifying:

$$E = 1 - (TC-TA)/(TB'-TB) \quad (6)$$

Since the compression stroke is isentropic, from equation 4:

$$PA \cdot VA^k = PB \cdot VB^k \quad (7)$$

Rearranging:

$$(VA/VB)^k = PB/PA \quad (8)$$

From equation 3:

$$PA\,VA/TA = PB\,VB/TB \quad (9)$$

Rearranging:

$$(VA/VB)(TB/TA) = PB/PA \quad (10)$$

Equating equations 8 and 10:

$$(VA/VB)^k = (VA/VB)(TB/TA) \quad (11)$$

Simplifying and substituting r=VA/VB (compression ratio):

$$TA \cdot r^{(k-1)} = TB \quad (12)$$

Since the expansion stroke is the same process as the compression stroke and the volumes are the same:

$$TC \cdot r^{(k-1)} = TB' \quad (13)$$

Substituting equation 12 for TB in equation 6 and equation 13 for TC in equation 6 and simplifying:

$$E = 1 - 1/r^{(k-1)} \quad (14)$$

This is the basic Otto cycle efficiency equation.

LS Cycle

The LS cycle efficiency begins in the same manner as equation 5, except the last term in the numerator is from equation 2:

$$E = (WC_V(Tc-Tb) - WC_P(Td-Ta))/WC_V(Tc-Tb) \quad (15)$$

Simplifying and substituting K' for $C_P/C_V$ (k' has a lower value than k because $C_V$ is hot and $C_P$ is cold, k'=1.11)

$$E = 1 - k'(Td-Ta)/(Tc-Tb) \quad (16)$$

Substituting equation 3 for all of the temperatures:

$$E = 1 - k'(Pa \cdot Vd - Pa \cdot Va)/(Pc \cdot Vb - Pb \cdot Vb) \quad (17)$$

Factoring:

$$E = 1 - k' Pa \cdot Va((Vd/Va) - 1)/Vb \cdot Pb((Pc/Pb) - 1) \quad (18)$$

From equation 4:

$$Pa/Pb = (Vb^k)/Va^k \quad (19)$$

Substituting equation 19 for Pa/Pb and using compression ratio:

$$E = 1 - k'((Vd/Va) - 1)/(r^{(k-1)})((Pc/Pb) - 1) \quad (20)$$

Solving for Vd/Va using equation 4:

$$PC \cdot Va^k = Pa \cdot Vd^k \quad (21)$$

From equation 4 and the fact that both compression and expansion are isentropic Pc/Pb=PC/Pa, so:

$$(Pc/Pb)^{(1/k)} = Vd/Va \quad (22)$$

substituting equation 22 for Vd/Va in equation 20 and setting N=Pc/Pb:

$$E = 1 - k'((N^{(1-k)}) - 1)/(r^{(k-1)})(N-1) \quad (23)$$

N is a function of the amount of fuel burned. Solving for N using:
H=Heating value of fuel, BTU/lb. mass (18,700)
f=fuel/air ratio lb. mass/lb. mass (15)

Beginning with equation 1:

$$HW = fWC_V(Tc - Tb) \quad (24)$$

The volume does not vary between states b and c, using equation 3:

$$Pc/Pb = Tc/Tb \quad (25)$$

Using equation 25 in equation 24 and substituting N for Pc/Pb:

$$H/fC_V = Tb(N-1) \quad (26)$$

Using equation 12 to solve for Tb in terms of Ta:

$$1 + H/fC_V Ta \cdot r^{(k-1)} = N \quad (27)$$

Substituting equation 27 for N in equation 23 yields the final efficiency equation for the LS cycle:

$$E = 1 - (k' Ta \cdot fC_V((1 + H/TafC_V r^{(k-1)})^{(1/k)} - 1)/H \quad (28)$$

Equation 28 shows that the LS cycle is more efficient than the Otto cycle at higher power levels when the value of f is low. At low power levels, when f is large, equation 28 reduces to equation 14. That is, at low power levels the efficiency of the Otto cycle and the LS cycle are substantially the same.

APPENDIX 2 LST SYSTEM

Full Power Specifications

LS ENGINE Prototype

The LS engine is a two cycle, two cylinder, compression-firing internal combustion engine.
5.13 Bore, in.
12 Stroke, in.
253 Frontside displacement volume, cubic in.
225 Backside displacement volume, cubic inches
5.3 Front side fully compressed volume, Cubic in./cyl.
2400 RPM, range 500 to 2500
95% Backside filling efficiency
66.7 Exhaust closing volume, cubic in.
31 Backside outlet pressure, psia
12.58 Compression ratio, range 11.3 to 23.6
18,700 Heating value of fuel, BTU/lb.
120.6 Fuel burned per hour, lbs/hour
53% Ratio of fuel burned at TDC
60 Mechanical loss excluding air pumping losses, Hp
400.5 Output to propeller, Hp
45% Efficiency
0.30 Fuel efficiency, lbs/Hp-hour (Also called specific fuel consumption, sfc)
103.4 Heat lost to coolant, BTU/second
1306 Cylinder head temperature, degrees F.
932 Piston top temperature, degrees F.

LST SYSTEM

59% Efficiency including the thrust from the TCF
0.23 Fuel efficiency including TCF thrust, lbs/Hp-hour

What is claimed is:
1. A power plant comprising:
an internal combustion engine comprising:
a first cylinder having a first closure means for closing said cylinder at one end and a second closure means for closing said cylinder at the other end;

a first piston closely fitted in said first cylinder and movable therein, said first piston and said first closure means forming a first combustion chamber of varying volume as said first piston moves in said first cylinder, and said first piston and said second closure means forming a first air pumping chamber of varying volume as said first piston moves in said first cylinder;

first connecting rod means associated with said first piston, said first connecting rod means having a first end connected to said first piston and said first connecting rod means passing through a seal means in said second closure means;

crank means for converting linear motion of said first piston into rotary motion, a second end of said first connecting rod means rotatably connected to said crank means, said crank means constraining the motion of said first piston to reciprocate in said first cylinder with a first stroke length, one end of said stroke near said first closure means, that end of stroke being top dead center, the other end of said stroke being bottom dead center;

shaft means for conducting rotary power outside said internal combustion engine, said shaft means associated with said crank means such that rotary motion of said crank means induces rotary motion of said shaft means;

first air-intake valve means for controlling flow of air for combustion into said first combustion chamber, said air-intake valve means connected by air passage means to said air pumping chamber and having an opening into said first combustion chamber adjacent said piston when said piston is at bottom dead center, said air pumping chamber being connected to an air-inlet passage by a one-way in-valve directed into said air pumping chamber, and said air pumping chamber being connected to said air passage means by a one-way out valve directed out of said air pumping chamber;

first fuel injection means for introducing combustible fuel into the air flowing into said first combustion chamber;

first exhaust valve means in said first closure means for porting said first combustion chamber to an exhaust manifold means, said first exhaust valve means opening at the same time in operation that said first air-intake valve means opens, and closing at a point in time that said first piston is moving in said first cylinder toward said first closure means, the portion of said stroke of said first piston toward said first closure means with said exhaust valve means closed being a compression stroke, and the portion of said stroke of said first piston toward said first closure means with said exhaust valve means open being an exhaust stroke, the stroke in the opposite direction being a power stroke; and control means for varying the time of closing of said first exhaust valve means to cause the absolute pressure in said combustion chamber at the end of said power stroke to be substantially the same as said pressure in said air pumping chamber at the end of said power stroke, so that said power stroke is substantially longer than both the compression stroke and the exhaust stroke.

2. A power plant as in claim 1 wherein, in said internal combustion engine, ignition of said fuel in said combustion chamber is provided by heat of compression produced during said compression stroke.

3. A power plant as in claim 1 wherein said internal combustion engine further comprises:

a second cylinder linearly opposed to said first cylinder with said crank means disposed therebetween; and further comprising in association with said second cylinder, a second piston, a third closure means forming a second combustion chamber with said second closure means and said second cylinder, a fourth closure means forming a second air pumping chamber with said second cylinder, a second exhaust valve means, a second connecting rod means, a second air-intake valve means, and a second fuel injection means as for said first cylinder, thereby forming a cylinder pair arranged such that said pistons and said connecting rod means for said cylinder pair move as a unit, having substantially zero relative motion with respect to one another.

4. A power plant as in claim 3 comprising an exhaust turbine, a compressor means, an inlet duct, an acceleration nozzle, and radiator means, said exhaust manifold means conducting exhaust gases from said internal combustion engine to expand through and provide motive power to said turbine, said turbine driving said compressor means to compress a first portion of incoming air through said inlet duct to said air inlet passage, the remaining portion of said incoming air passing-through said radiator, absorbing heat from said radiator means, said heat being heat energy delivered to said radiator means by cooling fluid from said internal combustion engine, and said exhaust gases, after expanding through said exhaust turbine, joining said remaining portion of said incoming air after said radiator means and expanding and accelerating through said acceleration nozzle.

5. A power plant as in claim 4 for propelling an aircraft, said power plant comprising a propeller means attached to said shaft means, wherein said propeller means is oriented to provide thrust to drive said aircraft, said inlet duct is oriented toward the direction of travel of said aircraft, and said acceleration nozzle is oriented to provide thrust from said exhaust gases expanding through said acceleration nozzle in substantially the same direction as thrust provided by said propeller means.

6. A power plant as in claim 1 wherein said control means comprises cam means associated with said crank means for opening said exhaust valve means, actuator means for holding said exhaust valve means open during said exhaust stroke, and computer means for operating said actuator means to close said exhaust valve means.

7. A power plant as in claim 1 wherein said air passage means comprises a cooler volume for holding air pumped by said first air pumping chamber, said cooler volume connected to said first air pumping chamber through said one-way out valve and to said first cylinder through said air-intake valve, said cooler volume being larger in volume than the maximum volume of said air pumping chamber to provide suppression of pressure surges in pumping.

8. A power plant as in claim 1 comprising an exhaust turbine, a compressor means, an inlet duct, an acceleration nozzle, and radiator means, said exhaust manifold means conducting exhaust gases from said internal combustion engine to expand through and provide motive power to said turbine, said turbine driving said compressor means to compress a first portion of incoming air through said inlet duct to said air inlet passage, the remaining portion of said incoming air passing through said radiator, absorbing heat from said radiator means, said heat being heat energy delivered to said radiator means by cooling fluid from said internal combustion engine, and said exhaust gases, after expanding through said exhaust turbine, joining said remaining portion of said incoming air after said radiator means and expanding and accelerating through said acceleration nozzle.

9. A power plant as in claim 8 for propelling an aircraft, said power plant comprising a propeller means attached to said means, wherein said propeller means is oriented to provide thrust to drive said aircraft, said inlet duct is oriented toward the direction of travel of said aircraft, and said acceleration nozzle is oriented to provide thrust from said exhaust gases expanding through said acceleration nozzle in substantially the same direction as thrust provided by said propeller means.

10. An internal combustion engine comprising:
   a first cylinder having a first closure means for closing said cylinder at one end and a second closure means for closing said cylinder at the other end;
   a first piston closely fitted in said first cylinder and movable forming a first combustion chamber of varying volume as said first piston moves in said first cylinder, and said first piston and said second closure means froming a first air pumping chamber of varying volume as said first piston moves in said first cylinder;
   power transfer means coupled to said first piston for performing work as said first piston moves in said first cylinder;
   first air-intake valve means for controlling flow of air for combustion into said first combustion chamber, said air-intake valve means connected by air passage means to said air pumping chamber and having an opening into said first combustion chamber adjacent said piston when said piston is at bottom dead center;
   first fuel injection means for introducing combustible fuel into the air flowing into said first combustion chamber;
   first exhaust valve means in said first closure means for porting said first combustion chamber to an exhaust manifold means, said first exhaust valve means being open during a time when said first air-intake valve means is open, and being closed at a point in time when said first piston is moving in said first cylinder toward said first closure means, the portion of said stroke of said first piston toward said first closure means with said exhaust valve means closed being a compression stroke, and the portion of said stroke of said first piston toward said first closure means with said exhaust valve means open being an exhaust stroke, the stroke in the opposite direction being a power stroke; and
   control means for varying the time of closing of said first exhaust valve means to cause the absolute pressure in said combustion chamber at the end of said power stroke to be substantially the same as said pressure in said air pumping chamber at the end of said power stroke, so that said power stroke is substantially longer than both the compression stroke and the exhaust stroke.

* * * * *